United States Patent [19]

Kamio et al.

[11] Patent Number: 5,101,786
[45] Date of Patent: Apr. 7, 1992

[54] CONTROL SYSTEM FOR CONTROLLING OUTPUT TORQUE INTERNAL COMBUSTION ENGINE

[75] Inventors: Shigeru Kamio, Nagoya; Mitsunori Takao, Kariya; Mitsuo Hara, Bisai; Katsuya Sakita, Oobu, all of Japan

[73] Assignee: Nippondenso Co., Ltd., Kariya, Japan

[21] Appl. No.: 674,751

[22] Filed: Mar. 25, 1991

[30] Foreign Application Priority Data

Mar. 26, 1990 [JP] Japan ............................... 2-76525

[51] Int. Cl.⁵ ............................................. F02D 11/10
[52] U.S. Cl. .................................. 123/399; 123/492; 74/860
[58] Field of Search ............... 123/361, 399, 403, 337, 123/478, 480, 492, 494; 74/860, 866; 180/178, 179

[56] References Cited

U.S. PATENT DOCUMENTS

| | | | |
|---|---|---|---|
| 4,543,933 | 10/1985 | Kessler et al. | 123/361 |
| 4,566,414 | 1/1986 | Sieber | 123/357 |
| 4,625,690 | 12/1986 | Morita | 123/399 X |
| 4,640,243 | 2/1987 | Abo et al. | 123/399 |
| 4,811,713 | 3/1989 | Shimada et al. | 123/399 |
| 4,854,283 | 8/1989 | Kiyono et al. | 123/399 X |
| 4,862,854 | 9/1989 | Oda et al. | 123/399 |
| 4,898,138 | 2/1990 | Nishimura et al. | 123/399 |
| 4,962,570 | 10/1990 | Hosaka et al. | 123/399 |

FOREIGN PATENT DOCUMENTS

| | | | |
|---|---|---|---|
| 0110226 | 6/1984 | European Pat. Off. | 123/399 |
| 58-77138 | 5/1983 | Japan . | |
| 00708490 | 4/1984 | Japan | 123/399 |
| 59-134338 | 8/1984 | Japan . | |
| 0196945 | 11/1984 | Japan | 123/399 |
| 60-6031 | 1/1985 | Japan . | |
| 60-164629 | 8/1985 | Japan . | |
| 60-164632 | 8/1985 | Japan . | |
| 61-88040 | 6/1986 | Japan . | |
| 2154765 | 9/1985 | United Kingdom | 123/399 |

Primary Examiner—Willis R. Wolfe
Attorney, Agent, or Firm—Cushman, Darby & Cushman

[57] ABSTRACT

A control apparatus for use in an internal combustion engine system of a motor vehicle equipped with an automatic transmission having therein a lock-up mechanism. There is included a vehicle resonance reducing section for controlling an opening degree of a throttle valve when the motor vehicle is in an acceleration state so as to reduce a vehicle resonance accompanying an operation of the engine. The vehicle resonance reducing section estimates a torque to be required for the engine on the basis of an accel-operating amount due to the vehicle drive and the engine operating state and corrects the estimated torque by using operation variables of the motor vehicle so as to calculate a target throttle opening degree. Also included in the control apparatus is a lock-up control section for compulsorily locking up the automatic transmission when the vehicle resonance reducing section is in operation. That is, the lock-up control is executed when controlling the opening degree of the throttle valve so as to reduce the vehicle resonance. With this arrangement, it is possible to improve the driveability of the motor vehicle by reducing the vehicle resonance concurrently with enlarging the lock-up region to improve the fuel consumption.

36 Claims, 22 Drawing Sheets

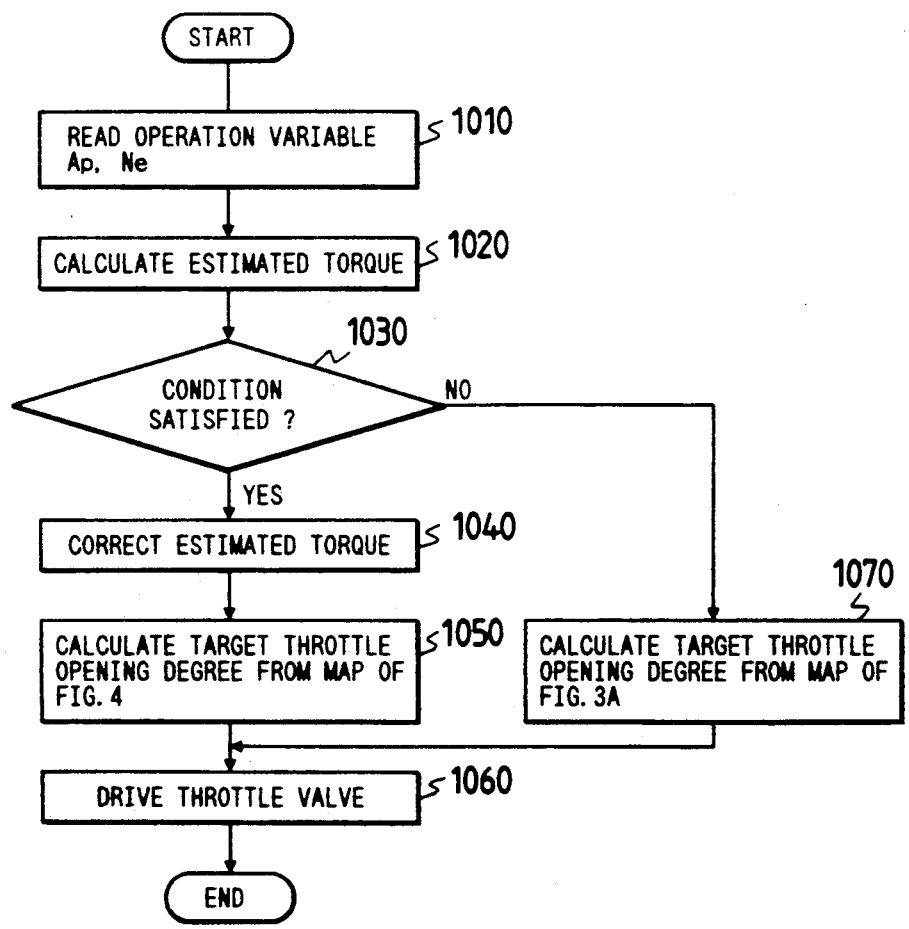

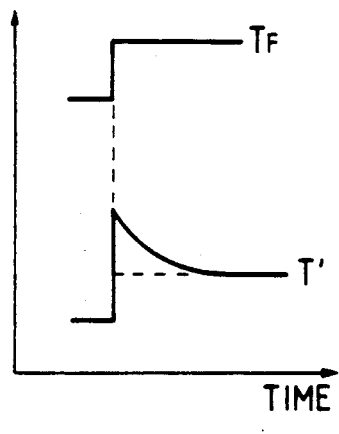
FIG. 6A
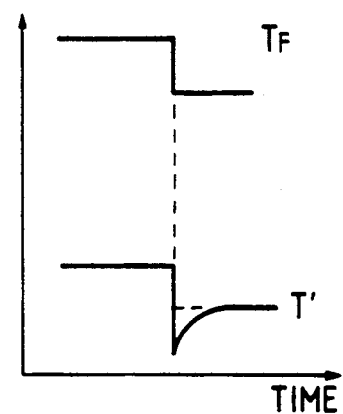
FIG. 6B
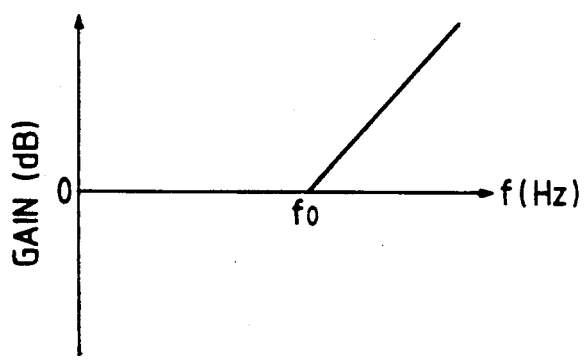
FIG. 7
FIG. 8
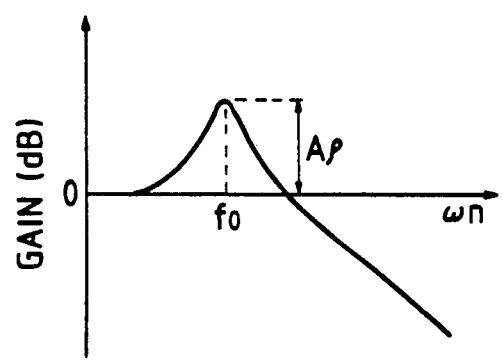
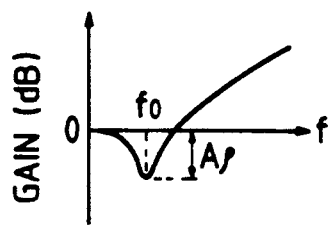
FIG. 9A
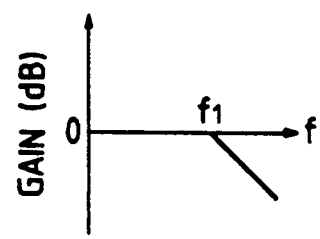
FIG. 9B FIG. 44
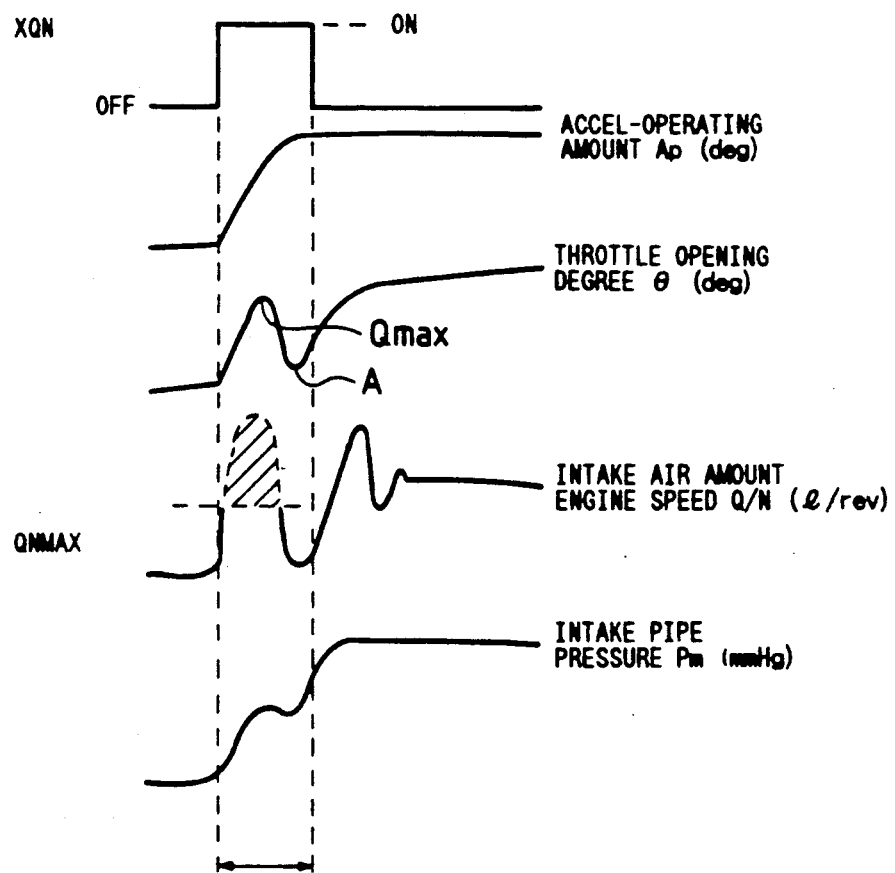
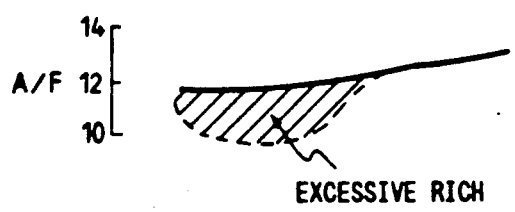
EXCESSIVE RICH
TIME ⟶

CONTROL SYSTEM FOR CONTROLLING OUTPUT TORQUE INTERNAL COMBUSTION ENGINE

BACKGROUND OF THE INVENTION

The present invention relates to a control system for controlling an output torque of an internal combustion engine of motor vehicles through control of a throttle valve of the engine.

Conventionally, in order to prevent hunting (vehicle resonance) of the motor vehicle occurring at the time of acceleration, a throttle valve is driven so as to decrease the output torque of the internal combustion engine such as disclosed in the Japanese Patent Provisional Publication No. 60-178940. In addition, in motor vehicles with an automatic transmission (A/T vehicles), lock-up control is executed with the input and output of a torque converter being mechanically coupled to each other. Such an arrangement allows the prevention of the hunting, while providing a problem in acceleration performance because the rising speed of the engine torque becomes dull from the intitial stage when depressing the acceleration pedal. For instance, for resolving this problem, the throttle valve can compulsorily and reversely be operated in the closing direction at the time of accelerating operation to thereby control the engine torque to meet the requirement of the transient response concurrently with preventing the hunting occurring at the time of the transition. However, in the conventional lock-up control, the execution is in practice prohibited at the time of a low-speed running state and an accelerating or decelerating operation because of increasing the vehicle vibration and vehicle shock. Thus, the lock-up-allowable region becomes narrower so as to deteriorate the fuel consumption reducing effect. In addition, there is a problem that the air flow meter overshoots in response to the acceleration so that its detection value becomes greater so as to excessively increase the fuel injection amount, thereby similarly deteriorating the fuel consumption.

SUMMARY OF THE INVENTION

It is therefore an object of the present invention to provide an engine torque control system for use in a motor vehicle which is capable of improving the fuel consumption at the time of acceleration.

With this and other features which will become apparent as the description proceeds, in accordance with the present invention, there is provided a control apparatus for use in an internal combustion engine system of a motor vehicle equipped with an automatic transmission having therein a lock-up mechanism, the control apparatus comprising: vehicle resonance reducing means for controlling an opening degree of a throttle valve when the motor vehicle is in an acceleration state so as to reduce a vehicle resonance accompanying an operation of said engine; and lock-up control means for compulsorily locking up the automatic transmission when the vehicle resonance reducing means is in operation. Preferably, the lock-up control means locks up the automatic transmission when the motor vehicle is in a predetermined operating state except that when the motor vehicle is in an start state and a speed-changing state.

In accordance with the present invention, there is further provided a control apparatus for use in an internal combustion engine of a motor vehicle, comprising: vehicle resonance reducing means for controlling an opening degree of a throttle valve on the basis of an operating condition of the engine so as to reduce a vehicle resonance accompanying an operation of the engine and further for reversely and temporarily moving the throttle valve in a closing direction when the motor vehicle is in an acceleration state; intake air amount detecting means mounted on the motor vehicle for detecting the amount of an intake air to be supplied to the engine; fuel injection amount calculating means for calculating a fuel injection amount on the basis of the detected intake air amount; and overshoot correction means for correcting an overshooting portion of the intake air amount detected by the intake air amount detecting means when the vehicle resonance reducing means is in operation and when the acceleration is at an initial stage so as to prevent overshooting of the fuel injection amount at the initial stage of the acceleration. Here, the initial stage of the acceleration is a time period until a predetermined time is elapsed after an operating speed of an acceleration pedal of the motor vehicle becomes above a predetermined value. Further, the overshoot correcting means performs the overshoot correction where an engine load to be obtained on the basis of the detected intake air amount is greater than a predetermined load value and is saturated with the predetermined load value if greater than the predetermined load value.

In accordance with the present invention, there is still further provided a control apparatus for use in an internal combustion engine of a motor vehicle, comprising: vehicle resonance reducing means for controlling an opening degree of a throttle valve on the basis of an operating condition of the engine so as to reduce a vehicle resonance accompanying an operation of the engine and further for reversely and temporarily moving the throttle valve in a closing direction when the motor vehicle is in an acceleration state; intake air amount detecting means mounted on the motor vehicle for detecting the amount of an intake air to be supplied to the engine; engine speed detecting means for detecting a rotational speed of the engine; fuel injection amount calculating means for calculating a fuel injection amount on the basis of the detected intake air amount and the detected engine speed; and calculation means for calculating a fuel injection amount on the basis of the opening degree of the throttle valve and the detected engine speed or on the basis of an intake pipe pressure when the vehicle resonance reducing means is in operation and when the acceleration is at an initial stage.

The vehicle resonance reducing means includes: the throttle valve for controlling a torque of the engine; accel-opening amount detecting means for detecting an operating amount of an acceleration pedal due to a driver of the motor vehicle; engine-operating state detecting means for detecting an operating state of the engine; vehicle operation variable detecting means for detecting a variable of the motor vehicle; torque estimating means for estimating a torque to be required for the engine on the basis of the detected accel-operating amount and the detected engine operating state; torque correcting means for correcting the estimated torque estimated by the torque estimating means on the basis of the detected vehicle operation variable so as to prevent hunting of the motor vehicle; target throttle opening degree calculating means for calculating a target throttle opening degree of the throttle valve on the basis of the corrected torque after the correction due to the torque correcting means; and throttle driving means for driving the throttle valve to the target throttle opening degree calculated by the target throttle opening degree calculating means.

In accordance with the present invention, there is additionally provided a control apparatus for use in an internal combustion engine of a motor vehicle, comprising: a throttle valve for controlling a torque of the engine; accel-operating amount detecting means for detecting an accel-operating amount due to a drive of the motor vehicle; throttle driving means for driving the throttle valve in accordance with the detected accel-operating amount so as to increase and decrease the torque of the engine in accordance with increase and decrease in said detected accel-operating amount; and torque control means for compulsorily controlling the torque of the engine in a direction reverse to the increasing or decreasing direction of the detected accel-operating amount while the detected accel-operating amount varies.

In accordance with this invention, there is further provided a control apparatus for use in an internal combustion engine of a motor vehicle, comprising: a throttle valve for controlling a torque of the engine; accel-operating amount detecting means for detecting an accel-operating amount due to a drive of the motor vehicle; throttle driving means for driving the throttle valve in accordance with the detected accel-operating amount so as to increase and decrease the torque of the engine in accordance with increase and decrease in the detected accel-operating amount; torque controlling means for compulsorily keeping the torque of the engine or reducing the increasing or decreasing speed of the torque of the engine at least one time for a predetermined time period while the detected accel-operating amount varies; vehicle operation variable detecting means for detecting an operation variable of the motor vehicle; and decision means for deciding the predetermined time period that the torque controlling means operates in accordance with the operation variable detected by the vehicle operation variable.

In accordance with this invention, there is still further provided a control apparatus for use in an internal combustion engine of a motor vehicle, comprising: first and second throttle valves for controlling a torque of the engine; accel-operating amount detecting means for detecting an accel-operating amount due to a driver of the motor vehicle; first throttle driving means for driving the first throttle valve in accordance with the detected accel-operating amount so as to increase or decrease the torque of the engine in accordance with increase or decrease in the accel-operating amount; and second throttle driving means for driving the second throttle valve at least one time in a direction reverse to the accel-operating amount increasing or decreasing direction when the accel-operating amount varies and when traction operation is not effected.

Preferably, the control apparatus further comprises acceleration state detecting means for detecting an acceleration state of said engine. The second throttle valve is normally opened by a predetermined opening degree, and the second throttle driving means temporarily drives the second throttle valve in the valve closing direction when the acceleration state detecting means detects the acceleration state of the engine and when the traction operation is not effected.

BRIEF DESCRIPTION OF THE DRAWINGS

The object and features of the present invention will become more readily apparent from the following detailed description of the preferred embodiments taken in conjunction with the accompanying drawings in which:

FIG. 2 is a flow chart showing an operation to be executed by an embodiment of this invention;

FIGS. 6A, 6B and 7 are graphic illustrations for describing the step 3000 in FIG. 5;

FIG. 8 is a graphic illustration for describing the vibration characteristic in teh forwarding and backwarding directions of a motor vehicle;

FIGS. 9A, 9B and 10 are graphic illustrations of filter characteristics for correcting the estimated torque;

FIG. 44 is a timing chart of the signals to be used in the FIG. 42 routine;

DETAILED DESCRIPTION OF THE INVENTION

Figure 1:
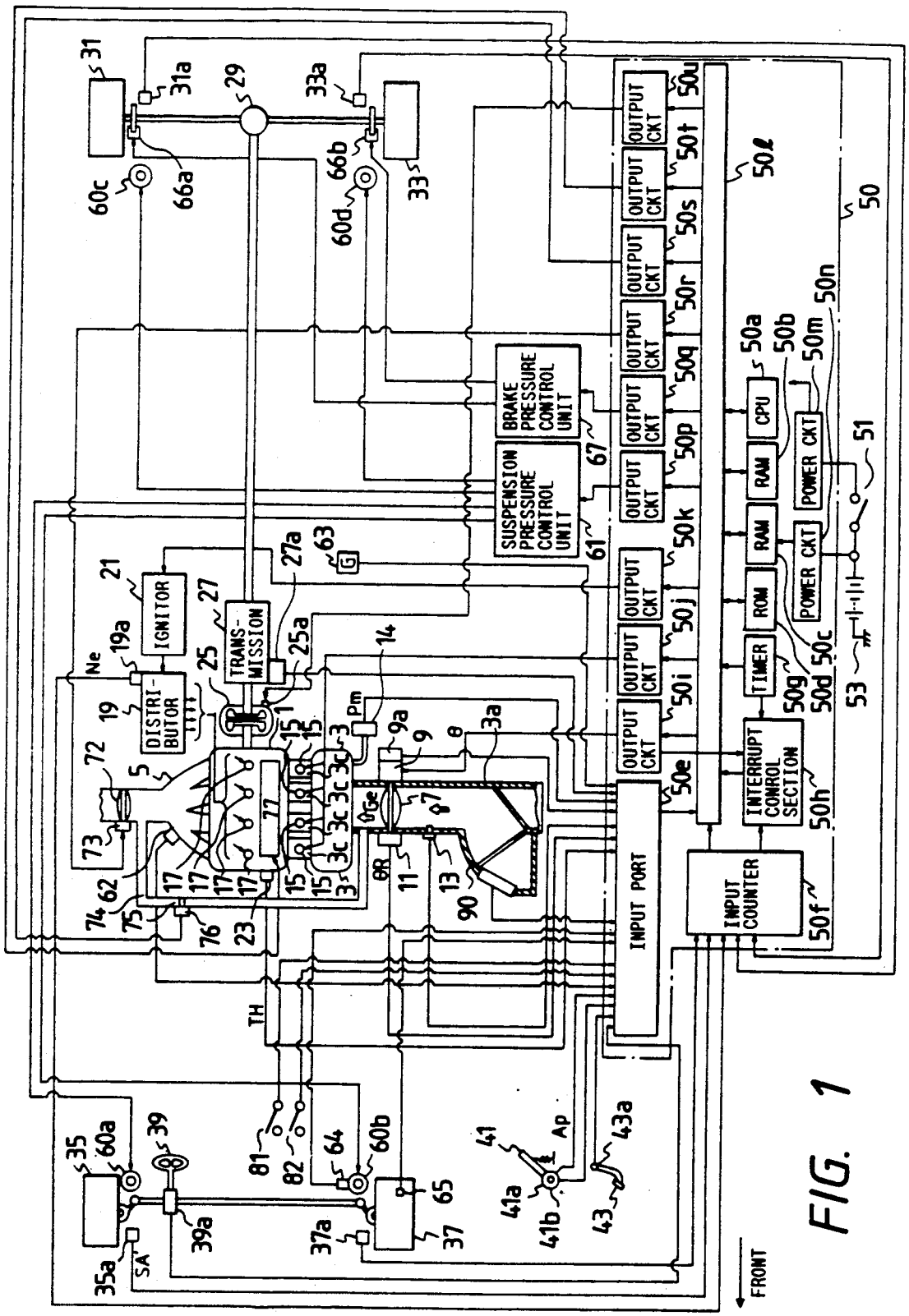
FIG. 1 is an illustration of an arrangement of this invention to be incorporated into an internal combustion engine of a motor vehicle.

FIG. 1 is a schematic illustration of an arrangement of an embodiment of a control system for an internal combustion engine of a motor vehicle. Illustrated at numeral 1 is an internal combustion engine (which will be referred hereinafter to as an engine) 1 which is a four-cylinder gasoline engine being in the spark ignition state and being mounted on a motor vehicle. To the engine 1 there are coupled an intake pipe 3 and an exhaust pipe 5. The intake pipe 3 is composed of a gathering section 3a coupled to an air cleaner, not shown, a surge tank 3b coupled to the gathering section 3a, and branch sections 3c branched from the surge tank 3b in correspondance with the respective cylinders of the engine 1. In the gathering section 3a there is provided a throttle valve 7 for adjusting the output (torque) generated by the engine 1 by adjusting the amount of air to be sucked to the engine 1. The valve stem of this throttle valve is coupled to a step motor 9 for adjusting the opening degree of the throttle valve 7 and further to a throttle sensor 11 for detecting the opening degree $\theta_R$ of the throttle valve 7 to gnerate a voltage signal corresponding to the throttle valve opening degree. In the step motor 9 there is provided a motor sensor 9a for sensing the full-closed position of the motor 9. Further, at the upper stream of the throttle valve 7 in the gathering section 3a there is provided an intake air temperature sensor 13 for detecting the intake air temperature. In the surge tank 3b there is provided an intake pipe pressure sensor 14 for detecting the pressure Pm within the intake pipe 3, and further in the branch sections 3c there are respectively provided electro-magnetical type fuel injection valves 15. In addition, in the enigne 1 there are provided ignition plugs 17 for igniting mixture sucked in correspindance with the respective cylinders. These ignition plugs 17 are coupled through a high-voltage cord to a distributor 19 which is in turn connected electrically to an ignitor 21. In the distributor 19 there is provided a rotation sensor 19a for outputting a signal in synchronism with the rotation of the engine 1.

Furthermore, in the engine 1 there is provided a water temperature sensor 23 for sensing the temperature TH of the cooling water which is for cooling the engine. The engine speed Ne is detectable on the basis of the signal of the rotation sensor 19a and the basic amount of the fuel injection amount can be calculated on the basis of the engine speed Ne, the intake pipe pressire Pm, the water temperature TH and others. The torque of the engine 1 depends upon the opening degree of the throttle valve 7. The torque generated by the engine 1 is transferred through a clutch 25, a transmission (speed change gear) 27, a differential gear 29 and others to a rear-right wheel 31 and rear-left wheel 33 which are driven wheels. In the transmission 27 there is provided a gear position sensor 27a for outputting a gear position signal indicative of the gear position, and for the drive wheels 31, 33 and non-driven wheels 35, 37 there are provided wheel speed sensors 31a,33a, 35a and 37a for sensing the wheel rotational speeds which are parameters necessary for the traction control and the automatic cruise control.

A steering-angle sensor 39a is provided in order to detect a steering angle SA of the front wheels 35 and 37 which is variable in response to operation of a steering wheel 39. Illustrated at numeral 62 is an air-fuel ratio sensor attached to the exhaust pipe 5 so as to detect an air-fuel ratio (A/F), and illustrated at numeral 63 is a G sensor provided at a lower portion of a dash board of the rear seat so as to detect the acceleration (vehicle G) of the motor vehicle in the forwarding and backwarding directions. References 60a, 60b, 60c and 60d are suspensions for the respective wheel sections. Under control of a suspension hydraulic pressure control unit 61, the hydraulic pressure of the suspension is controllable so as to control the damper characteristic (damping force of the shock absorber). Further, on the front-left wheel suspension 60b there is provided a suspension-deflection (stroke) sensor 64 for detecting the deflection amount of the suspension. The deflection amount of the suspension detected by means of this sensor 64 allows estimation of the loadage of the motor vehicle.

Illustrated at numeral 65 is a tire air-pressure sensor for detecting the air pressure of the tire, and illustrated at 66a and 66b are braking devices for the rear wheels whose braking hydraulic pressures are controllable by means of a braking hydraulic pressure control unit 67. Numeral 90 is a vane type air-flow meter provided within the intake pipe 3 to detect the intake air amount $\theta$. Numeral 25 represents a torque converter (automatic gear) equipped with a lock-up mechanism, 25a depicts a solenoid-operated valve for controlling the hydraulic pressure for the lock-up, the solenoid-operated valve 25a taking ON/OFF states in accordance with a signal from an output circuit 50u.

A description will be made hereinbelow in terms of the torque converter 25 equipped with the lock-up mechanism. This torque converter 25, being equipped with the lock-up mechanism, has therein a clutch (not shown) so as to allow rotation by uniting the engine side with the transmission side. That is, this converter is a torque converter which allows the switching from the power transmission made due to a fluid to a mechanical power transmission. The above-mentioned clutch (not shown) is disposed at the transmission rotation side and is arranged to have a clutch plate (not shown) which can be pressed to the engine rotation side by means of the fluid so as to allows unitary rotation. Further, in response to changing the direction of flow of the fluid, this clutch plate can be separated from the engine rotation side to be released from the lock-up state.

In an electronic control unit (ECU) 50 there are stored speed-change patterns and lock-up patterns, and to the ECU 50 there are supplied a vehicle speed signal due to a vehicle speed sensor and electrical signals such as a signal indicative of the accel-opening degree sensed by a throttle position sensor. The ECU 50 determines one of the first to third gear positions and OD and further determines the lock-up operation to be set to the ON or OFF state, whereupon performing the speed-change operation by switching the oil passage and effecting the lock-up operation. Here, since in the ECU 50 there are stored a plurality of speed-change patterns, the vehicle driver can select the speed-change pattern only with the operation of a selection switch.

Illustrated at numeral 72 is an exhaust pressure control valve which is driven by means of a step motor 73 so as to control the exhaust pressure. Illustrated at numeral 75 is a valve for controlling the exhaust gas recirculation (EGR) amount in an exhaust gas recirculation system, the valve 75 being driven by means of a step motor 76. The exhaust gas to be recirculated flows from the exhaust pipe 5 through a passage 74 to a downstream portion of the throttle valve 7. Numeral 77 is a variable valve timing device (VVT) for controlling the valve timings and lift amounts of intake and exhaust valves, which is disclosed in the Japanese Patent Provisional Publication No. 64-3214.

The electronic control unit (ECU) 50 is responsive to signals from the above-described sensors, an acceleration pedal operating amount sensor 41a for outputting a signal A corresponding to the operating amount of an acceleration pedal 41, an accel-full-close state sensor 41b for detecting the fully-closed state of the accel resulting from the release of the acceleration pedal 41, a brake sensor 43a which enters into the ON state in response to depression of a brake pedal, and a clutch sensor 42a which enters into the ON state in response to depression of a clutch depal 42. On the basis of the input of these signals, the ECU 50 outputs signals for operations of the step motor 9 for the throttle valve, the injection valve 15, the ignitor 21 and the other devices (61, 67, 73, 76, 77).

Further, the above-mentioned ECU 50 is equipped with a CPU 50a for execution of various calculations, a RAM 50b for temporarily storing data to be necessary for the calculations in the CPU 50a, and a RAM 50c for storing data to be similarly necessary for the calculations in the CPU 50a and to be sequentially updated in the engine operation and further to be necessary to be kept even after the turning-off of a key switch 51 of the motor vehicle. Also included in the ECU 50 are a ROM 50d for in advance storing constants and others to be used in the calculations of the CPU 50a, an input port 50e and an input counter 50f for inputting the signals from the above-mentioned sensors, a timer 50g for measuring the time, and an interrupt control section 50f for interrupting the CPU 50a in accordance with the data contents of the input counter 50f and the timer 50g. Further included therein are output circuits 50i, 50j, 50k, 50o, 50p, 50r, 50s 50t for outputting signals to drive the step motor 9, injection valve 15, ignitor 21 and other control devices (61, 67, 73, 76, 77), a bus line 50l for the data transmission between the CPU 50a and the respective elements associated with the CPU 50a, a power source circuit 50m coupled through the key switch 51 to a battery 53 so as to supply a power to the respective elements except the RAM 50c, and another power source circuit 50n directly coupled to the battery 53 so as to supply a power to the RAM 50c.

Illustrated at numeral 81 is an auto-cruising switch which is turned on by the vehicle driver when executing the auto-cruising control, and illustrated at numeral 82 is a sports mode switch to be turned on by the vehicle drive when particularly selecting a sporty running having a sharp rise at the time of acceleration. In response to this sports mode switch 82 entering into the ON state, the rising characteristic of the throttle valve 7 at the time acceleration, which will be described hereinafter, is changeable.

Vehicle Resonance Reducing Control

A description will be made hereinbelow in terms of the vehicle resonance reducing control which is common to the respective embodiments of this invention. FIG. 2 is a basic flow chart for the vehicle resonance reducing control to be executed by the ECU 50, which starts with a step 1010 to read vehicle-operating variables such as an accel-operating amount Ap due to the vehicle driver, an engine speed Ne and a vehicle speed. A step 1020 follows to estimate a necessary torque of the engine on the basis of the accel-operating amount Ap and the engine speed Ne so as to obtain an estimated torque which becomes the base of parameters for driving the throttle valve. A subsequent step 1030 is executed in order to check whether a condition is satisfied, the condition being for calculating a target torque by correcting the estimated torque obtained in the step 1020 in order to preventing hunting of the motor vehicle in the forwarding and backwarding directions when the vehicle driver performs the acceleration or deceleration operation and, if the answer of the step 1030 is affirmative, the correction of the estimated torque being effected in the next step 1040 in accordance with a flow chart of FIG. 11 which will be described hereinafter. Thereafter, the operational flow advances from the step 1040 to a step 1050 so as to calculate a target throttle opening degree on the basis of the target torque obtained n the step 040 by the correction of the estimated torque. A step 1060 is then executed to supply a drive signal to a step motor for the throttle valve so as to achieve the target throttle opening degree obtained in the step 1050. A step 1070 is provided in order to directly calculate the target throttle opening degree on the basis of the estimated torque $T_T$ obtained in the step 1020 when the answer of the step 1030 is negative.

Figure 3A:
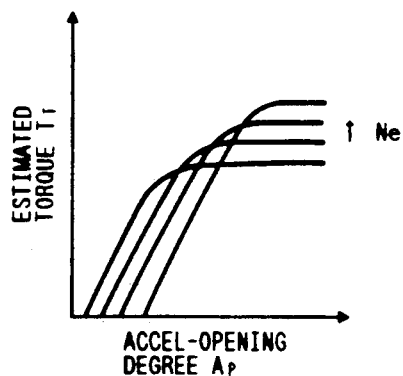
FIG. 3A is a graphic diagram showing the relation between between the accel-operating amount Ap and the estimated torque $T_T$.
Figure 3B:
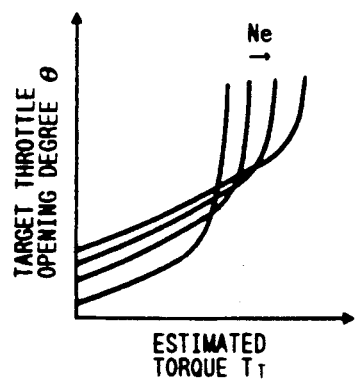
FIG. 3B is a graphic diagram showing the conventional relation between the estimated torque $T_T$ and the target throttle opening degree $\theta$.
Figure 36A:
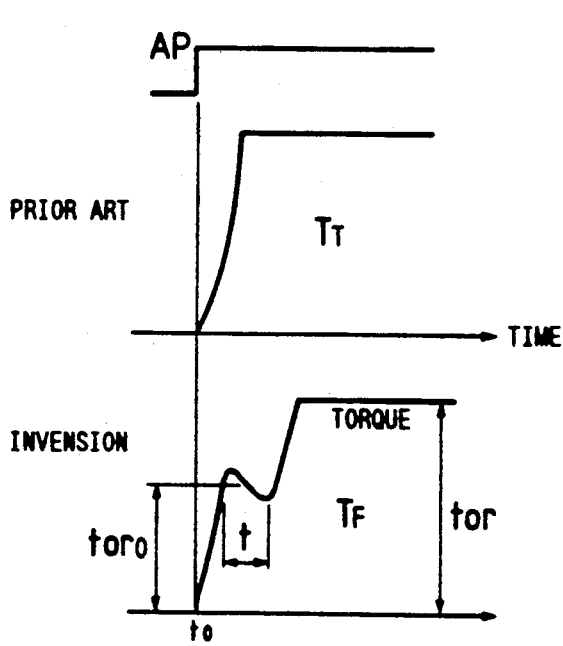
FIGS. 36A and 36B are timing charts showing the torques at the timing of the acceleration.
Figure 36B:
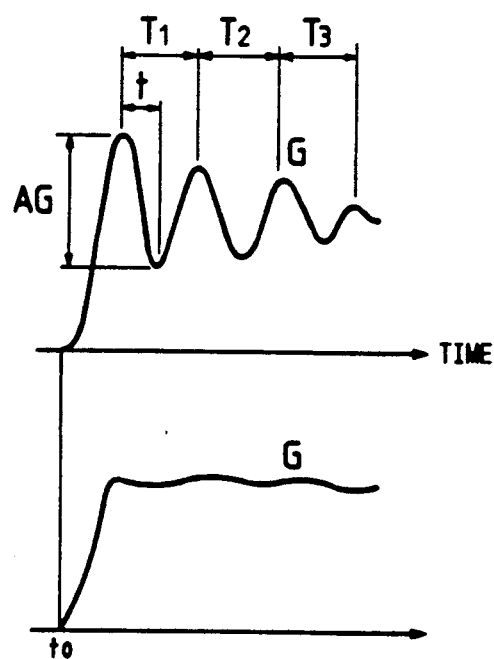

A more detailed description will be made in terms of the flow chart illustrated in FIG. 2. First, in the step 1020, the engine torque $T_T$ required by the vehicle driver can be estimated on the basis of the operating amount Ap of the acceleration pedal 41 due to the driver and the engine speed Ne at that time in accordance with a map as illustrated in FIG. 3A. FIG. 3B shows the reverse conversion of the map illustrated in FIG. 3A. Since in the prior art this estimated torque $T_T$ is reversely converted directly by using the map illustrated in FIG. 3B so as to determine the target throttle opening degree $\theta$, in cases where the vehicle driver executes a rapid acceleration operation as illustrated in FIGS. 36A and 36B, the acceleration degree G in the forwarding and backwarding directions greatly takes hunting before and after the execution so as to be uncomfortable to drive. Further, in order to prevent the hunting, it is considered that the signal indicative of the acceleration pedal operating amount Ap which represents the rapid acceleration operation due to the driver is arranged to become less steep, while this causes deterioration of the acceleration performance. On the other hand, in this control operation, as will be described hereinafter, the signal indicative of the engine torque $T_T$ estimated in the step 1020 is corrected with a characteristic which is capable of effectively and compatibly performing the rising on the acceleration and the prevention of the hunting in the step 1040, the corrected engine torque $T_T$ is determined as the target torque $T_F$.

Figure 3C:
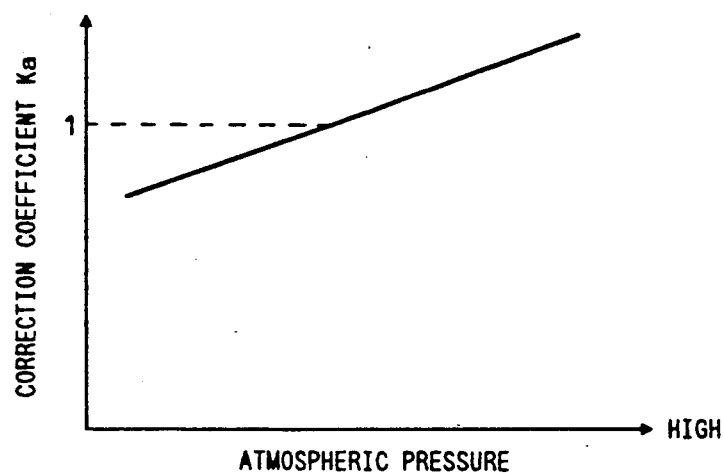
FIG. 3C illustrates the relation between the atmospheric pressure and the correction coefficient Kw.
Figure 3D:
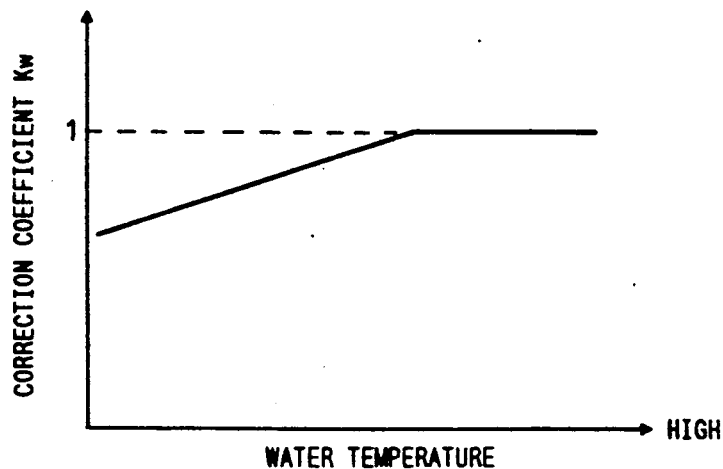
FIG. 3D shows the relation between the water temperature and the correction coefficient Kw.

Here, in place of the use of the map illustrated in FIG. 3A, it is also appropriate to correct the estimated torque by checking whether a supercharger is in operation. That is, when the supercharger is in operation, the estimated torque $T_T$ is set to relatively become great. Further, similarly, the variable valve timing device VVT and the intake and exhaust control unit set the estimated torque $T_T$ to be greater as the engine torque is increased. Furthermore, since the engine torque varies in accordance with the atmospheric pressure and the water temperature, the estimated torque $T_T$ is preferably corrected in accordance with maps as illustrated in FIGS. 3C and 3D. That is, a value $T_T \cdot Kw \cdot Ka$ obtained by multiplying correction coefficients ka and kw may be set to a new estimated torque $T_T$. Here, instead of the above-described estimated engine torque $T_T$, it is also appropriate to use the corresponding parameter other than the torque, for example, the intake pipe negative pressure Pm, or the intake air amount Qo/Ne per one revolution of the engine in the case of the system equipped with an airflow meter. Further, the calculation of the estimated torque $T_T$ is not necessarily effected in accordance with the maps of FIG. 3A but may be effected in accordance with the following equations.

$$S = k_1 - k_2 \cos(Ap)$$

$$T_T = S\sqrt{k_3 \cdot \frac{S^2}{Ne^2} + k_4 - \frac{k_5 S^2}{Ne}}$$

where $k_1$ to $k_5$ positive constants.

As a result of the correction of the estimated torque $T_T$ in the step 1040 in accordance with a method which will be described hereinafter, the target torque $T_F$ is determined and in the next step 1050 the target throttle opening degree $\theta$ is calculated on the basis of the target torque $T_F$ so tha the throttle valve 7 is operated so as to take the opening degree $\theta$. Here, in a motor vehicle having an engine with a supercharger, the constants $k_1$ and $k_2$ may be more increased as the supercharging amount increases.

Here, in the case of converting the target trque $T_F$ into the throttle opening degree directly using the map illustrated in FIG. 3B, the hunting can occur. Namely, the FIG. 3B map is only the reverse conversion of the FIG. 3A map and the delay of the intake air flow passing through the throttle valve 7 is not considered at all.

Now, in the intake system there is generally satisfied the following conditions.

$$Gin = k_1 \cdot A(\theta) \cdot \sqrt{Pa - Pm} \tag{1}$$

$$Ge = k_2 \cdot Ne \cdot Pm \tag{2}$$

$$Gin - Ge = k_3 \cdot \frac{dPm}{dt} \tag{3}$$

$$A(\theta) = k_4 - k_5 \cos\theta \tag{4}$$

where

Gin : the mass (g/s) of air passing through the throttle valve 7 for one second;

Ge : the mass (g/s) of air to be sucked into the engine 1;

$A(\theta)$ : the opening area corresponding to the throttle opening degree $\theta$;

Pa : the atmospheric pressure; and $k_1$ to $k_5$ : positive constants.

If solving the above-mentioned equations, the following relation can be obtained between the intake pipe pressure Pm at the downstream of the throttle valve 7 and the throttle opening degree $\theta$.

$$\theta = \cos^{-1}\left[\frac{k_4}{k_5} - \frac{ke\, Ne\, Pm}{k_1 k_5 \sqrt{Pa - Pm}} + \frac{k_3}{k_1 k_5 \sqrt{Pa - Pm}} \cdot \frac{dPm}{dt}\right] = \cos^{-1}\left\{\frac{k_4 - (As + f(Pm))\frac{dPm}{dt}}{k_5}\right\} \tag{5}$$

where $$As = \frac{k_3\, Ne\, Pm}{k_1 \sqrt{Pa - Pm}} \tag{6}$$

$$f(Pm) = \frac{2\, k_3\, (Pa - Pm)}{k_2\, Ne\, (2Pa - Pm)} \tag{7}$$

Figure 4:
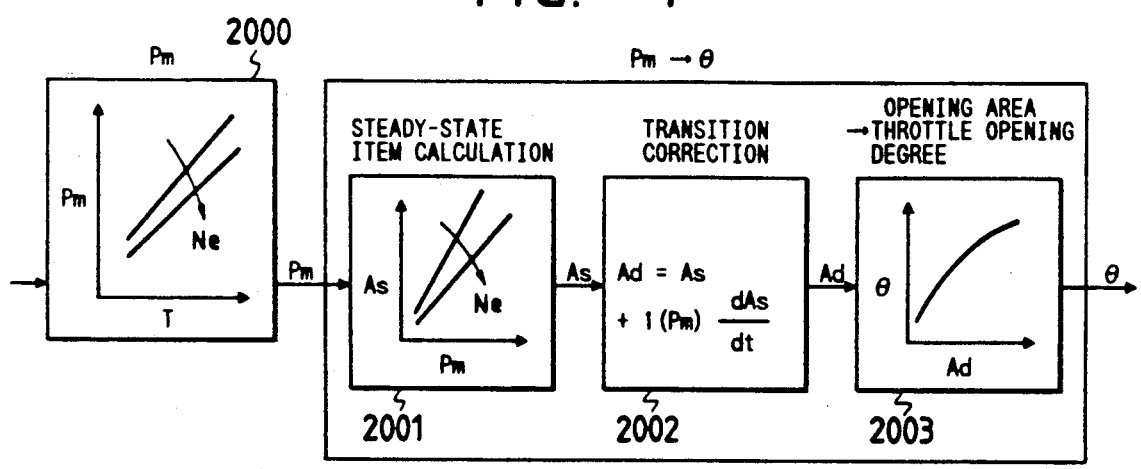
FIG. 4 is a flow chart for describing the conversion of the target torque $T_F$ into the target throttle opening degree $\theta$.

Between the torque T and the intake pipe pressure Pm there is generally provided a map characteristic as illustrated in a step 2000 in FIG. 4. Thus, the intake pipe pressure Pm corresponding to the target torque $T_F$ is calculated in accordance with the map in the step 2000, and after the calculation, the target throttle opening degree $\theta$ can be calculated in accordance with the above-mentioned equations (5) to (7). Here, in the conversion of Pm into $\theta$ due to the equations (5) to (7), the calculation is complicated so as to increase the load to the CPU 50a. and hence it is more advantageous to perform the map retrieval shown in the flow chart of FIG. 4. More specifically, after the conversion of the target torque $T_F$ into the intake pipe pressure Pm, As is retrieved in accordance with a map shown in a step 2001 in place of the equation (6), and in a subsequent step 2002 the throttle opening area Ad is calculated which is required from the difference of As, that is, $$Ad = As + f(Pm) \cdot \frac{dAs}{dt}$$

At this time, f(Pm) is also calculated by a map retrieval, not shown, instead of the equation (7). Here, As represents the opening area of a steady-state throttle valve (in the case that the throttle valve is in the static state), and Ad depicts the opening area of the throttle valve, finally necessary, obtained by adding the transient correction such as acceleration/deceleration to the opening area of the steady-state throttle valve. Thereafter, the operational flow advances to a step 2003 so as to obtain the target throttle opening degree $\theta$ on the basis of the opening area Ad in accordance with a map. It is also appropriate that in the step 2003 the target throttle opening degree $\theta$ is directly calculated in accordance with the following equation in place of the map.

$$\theta = \cos^{-1}\left( \frac{k - (As - Ad)}{k'} \right)$$

where k and k' are constants.

With the calculation being effected by the above-mentioned method, the conversion of $T_F$ into $\theta$ considering the delay of the intake system can be realized.

Figure 5:
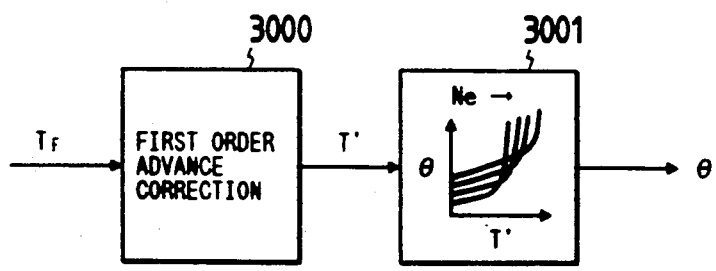
FIG. 5 shows a modification of the FIG. 4 flow chart.

Secondly, a description will be made in terms of a second method for realizing the conversion of $T_F$ into $\theta$ considering the delay of the intake system in the step 1050. FIG. 5 is a flow chart showing the second method. Although utilizing the above-described map of FIGS. 3A to 3D, this method involves trasient-correcting the value of $T_F$ in the first order lead system (step 3000) before the conversion of $T_F$ into $\theta$ (step 3001) due to the map retrieval in FIGS. 3A to 3B. The first order lead correction has characteristics as illustrated in FIGS. 6A and 6B, i.e., is for outputting a waveform converging to a steady-state value after overshooting or undershooting with respect to the stepwise increasing or decreasing input of the target torque $T_F$. This first order lead correction characteristic can be calculated in accordance with the following equation.

$$T'_i = L_1(T_i - T_{i-1}) - L_2(T'_i - T'_i) + T'_{i-1}$$

where $T'_{i-1}, T'_i$: the previous output value and the present output value;
$L_1, L_2$ constants; and
$T_{i-1}, T_i$: the previous input value and the present input value.

Further, the first order lead correction characteristics as illustrated in FIGS. 6A and 6B can be realized only with a filter as illustrated in FIG. 7. This filter is for amplifying the target torque $T_F$ at a frequency region above the inherent frequency fo which is the hunting frequency peculiar to the motor vehicle which will be described hereinafter, and can realize the trasient correction in consideration with the delay on the conversion of $T_F$ into $\theta$.

Now, a description will be made in terms of a first embodiment in the step 1040 of FIG. 2 for converting the estimated torque $T_T$ into the target torque $T_F$. As described above, the stepwise variation of the torque causes hunting of the motor vehicle to occur as illustrated in FIG. 36B. The occurrence of the hunting is because the torque and the acceleration (vehicle G) in the forwarding and backwarding directions of the motor vehicle belong to the second order spring-mass system system. The vehicle G represented by the transfer function is as follows.

$$G = \frac{\omega_n^2}{S^2 + 2\rho\omega_n S + \omega_n^2}$$

where $\omega_n$: frequency, $\rho$: damping factor.

The frequency characteristic becomes as illustrated in FIG. 8. The amplification of the natural frequency fo component in FIG. 8 causes the hunting. $A\rho$ is the damping amount and the occurrence of the hunting becomes easier as the damping amount increases.

The present inventors have found that the prevention of the hunting can be achieved by using a filter having a characteristic reverse to the FIG. 8 frequency characteristic, i.e., a filter having a characteristic as illustrated in FIG. 9A, with respect to the estimated torque $T_T$. That is, with the filter characteristic as illustrated in FIG. 9A, it is possible to reduce the damping amount $A\rho$ concurrently with attenuating the natural frequency fo.

Figure 10:
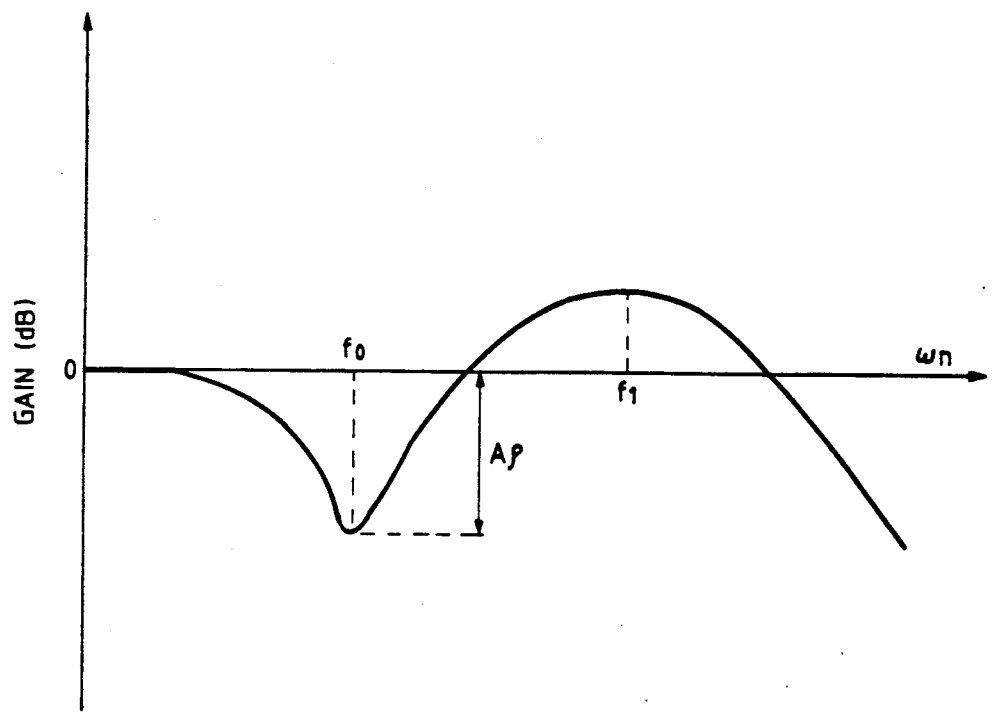

In this embodiment, in order to compensate for the vehicle stability with respect to the variation of the pedal operating amount due to the vehicle driver which resulting from the change of responsibility of the throttle actuator and the movement of the motor vehicle in the forwarding and backwarding directions in synchronism with the road surface disturbance, a filter having a characteristic for damping above a high-frequency region fl as illustrated in FIG. 9B is combined in series with the filter as illustrated in FIG. 9A, thereby finally producing a filter having a characteristic as illustrated in FIG. 10 to be applied to the estimated torque $T_T$. The natural frequency fo and the damping signal of the FIG. 10 filter are indicated as follows.

$$fo = 2\pi \sqrt{\frac{k}{M}} , \quad \rho = \frac{C}{2\sqrt{Mk}}$$

where $\rho$: damping factor, k: vehicle spring constant, M: weight, C: damper characteristic.

Here, the spring constant k varies in accordance with the suspension hardness (in the case of the air damper). The weight M is determined by the sum of the mass of the motor vehicle and the inertial mass when viewing the drive system from the wheel side. This inertial mass varies in accordance with the change gear ratio (transmission gear ratio). That is, the inertial mass of the drive system with respect to the wheel side becomes greater as the change gear ratio becomes greater. Further, the damper characteristic C varies in accordance with the suspension hardness and the tire air pressure. From the above, the filter characteristic may be changed in accordance with the transmission gear position, suspension hardness, vehicle mass, tire air pressure and others.

Figure 11:
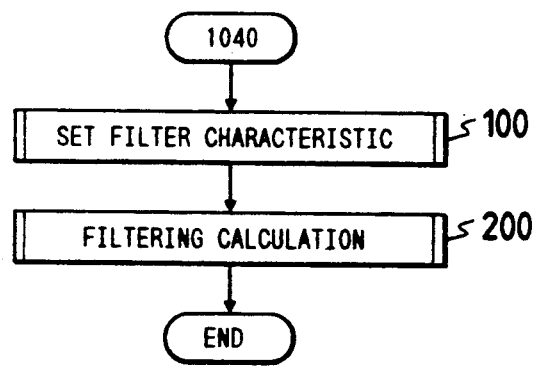
FIG. 11 is a flow chart showing the procedure of a first embodiment of the step 1040 in FIG. 2.
Figure 12:
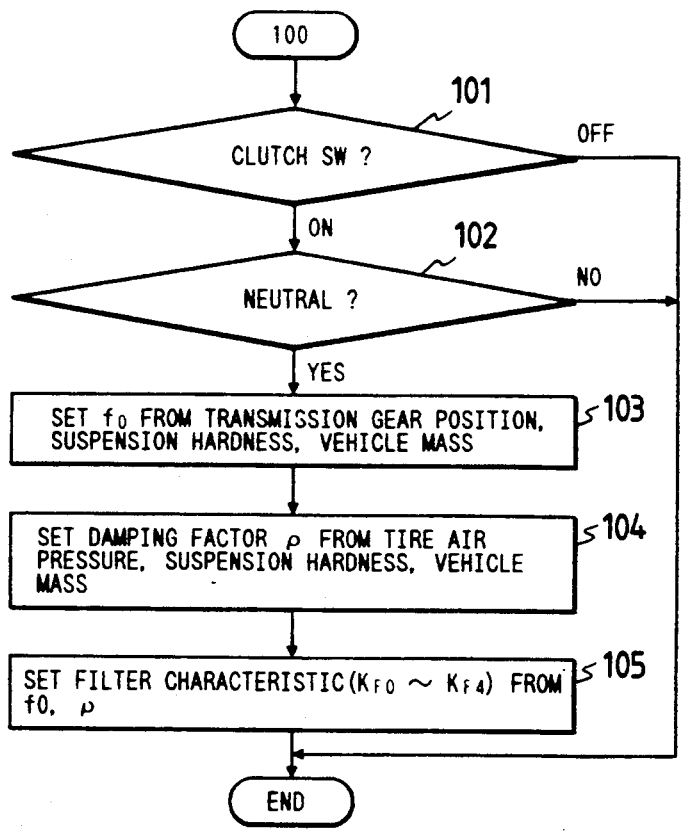
FIG. 12 is a flow chart for describing the step 100 of FIG. 11.
Figure 13:
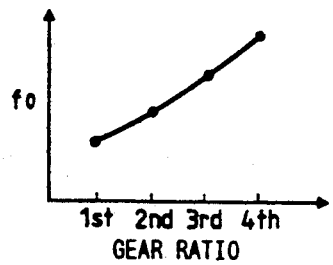
FIG. 13 shows the relation between the transmission gear ratio and the basic natural frequency fo'.
Figure 14:
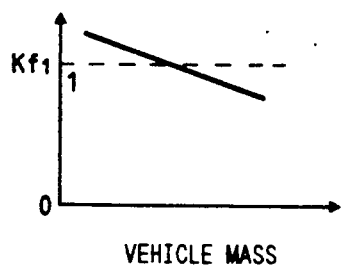
FIG. 14 illustrates the relation between the vehicle mass and the correction coefficient Kf1.
Figure 15:
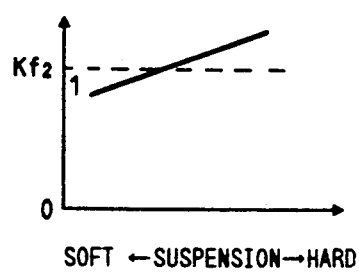
FIG. 15 shows the relation between the hardness of the suspension and the correction coefficient Kf2.

Secondly, a description will be made in terms of the procedure for filtering the estimated torque $T_T$ with reference to flow charts illustrated in FIGS. 11, 12 and 20. As illustrated in FIG. 11, the filtering process mainly comprises two routines. A step 100 is a routine for setting the filter characteristic illustrated in FIG. 10 and a step 200 is for performing the actual calculation with the set filter characteristic. FIG. 12 shows a routine for the filter characteristic setting in the step 100. Steps 101 and 102 are for checking whether the engine in in the unloaded state. If the switching to the FIG. 10 characteristic is effected at the time of the loaded operation such as acceleration operation, the vehicle shock can occur, and therefore the switching is effected only at the time of the unloaded state, that is, when the clutch sensor 42a is in the ON state or when the speed-changing gear 27 is in the neutral state, for example, at the time of the transmission gear changing or the vehicle stopping. If the engine is in the unloaded state, the operational flow advances to a step 103 so as to set the speed-change gear position, the hardness of the suspension (in the case of the air damper), and the natural frequency fo corresponding to the vehicle mass. Since the hunting occurs only in the frequency region above the frequency fo, in this hunting region the estimated torque $T_T$ may be attenuated. Now, let it be assumed that fo = fo'. kf1·kf2 (fo' : a basic natural frequency, kf1 : a correction coefficient of fo determined by the vehicle mass, kf2 : a correction coefficient of fo determined by the hardness of the suspension). These values fo', kf1 and kf2 are set as illustrated in FIGS. 13, 14 and 15, respectively. That is, the natural frequency fo is set to be lower as the gear position is lower, as the vehicle mass is greater and as the hardness of the suspension is lower.

Figure 16:
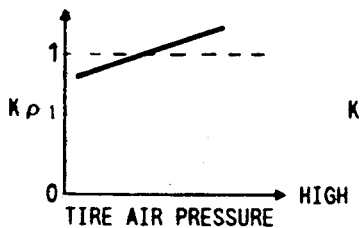
FIG. 16 illustrates the relation between the air pressure of the tire and the correction coefficient K$\rho$1.
Figure 17:
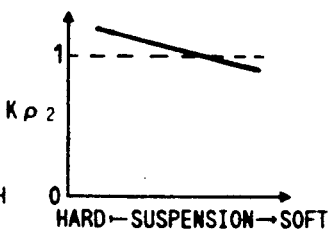
FIG. 17 shows the relation between the hardness of the
10 suspension and teh correction coefficient K$\rho$2.
Figure 18:
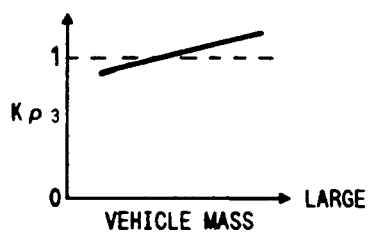
FIG. 18 illustrates the relation between the vehicle mass and the correction coefficient K$\rho$3.

Thereafter, the control goes to a step 104 so as to set a damping signal. A specific basic damping factor $\rho'$ to be determined in accordance with the elasticity of the foot section (suspension, damper and others) of the motor vehicle is in advance stored and this basic damping factor $\rho'$ is corrected by correction coefficients shown in FIG. 16 to 18 in accordance with the vehicle operating variables such as the tire air pressure, suspension hardness and vehicle mass. The damping factor o is calculated in accordance with an equation, i.e., $\rho = \rho'·k\rho1·k\rho2·k\rho3$ (k$\rho$1 : a correction coefficient of $\rho$ determined by the tire air pressure, k$\rho$2 : a correction coefficient of p determined by the hardness of the suspension, k$\rho$3 : a correction coefficient of $\rho$ determined by the vehicle mass). Namely, the damping factor $\rho$ is set to be smaller as the tire air pressure is lower, as the suspension hardness is lower and as the vehicle mass, i.e., the loading amount, is smaller. Here, the damping amount Ap more increases as the damping factor $\rho$ becomes smaller.

Figure 19:
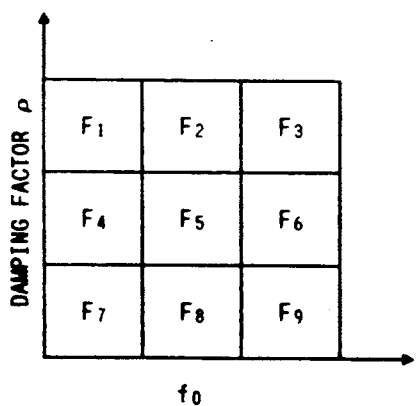
FIG. 19 is an illustration of a map for calculation of the filter characteristic.

Thereafter, the operation proceeds to a step 105 to select one from nine kinds of filter characteristics Fi (i=1, ..., 9) on the basis of the natural frequency fo and damping factor $\rho$ obtained in the steps 103 and 104, using a map as illustrated in FIG. 19. The respective filter characteristics Fi are for determining five coefficients kfo to kf4 to be used for the filtering calculation which will be described below, and are in advance stored in the ROM 50d. In the routine illustrated in FIG. 12, the execution of changing the filter characteristic is prohibited at the time of loading. With the above-described operations, the filter characteristic setting routine 100 in FIG. 11 is terminated.

Figure 20:
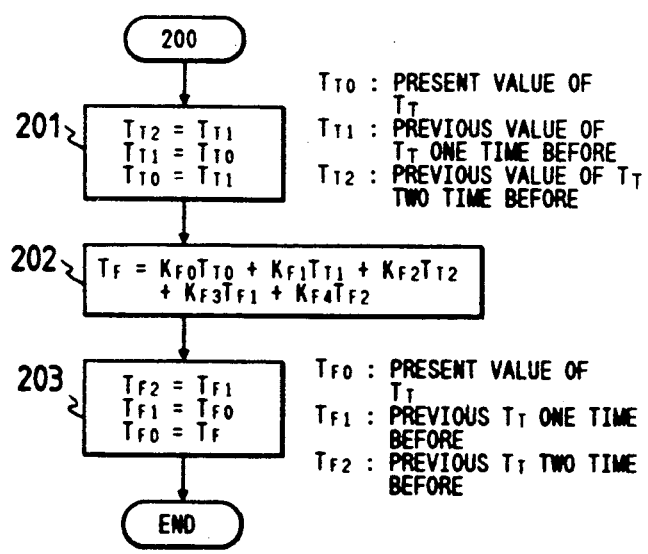
FIG. 20 is a flow chart for describing the step 200 in FIG. 11.

FIG. 20 illustrates a detailed procedure for the filtering calculation routine 200. The filtering calculation is performed on the basis of the value of the estimated torque $T_T$ obtained two tires before and the value of the filter characteristic coefficient obtained in the step 150 of FIG. 12. A step 201 is for updating the previous value of the estimated torque $T_T$, being an input, and reading the present estimated torque $T_T$, and a step 203 is for updating the previous value of the target torque $T_F$ which is an output. The conversion of the estimated torque $T_T$ into the target torque $T_F$ is executed in a step 202. That is, $$T_F = k_{F0}T_{T0} + k_{F1}T_{T1} + k_{F2}T_{T2} + k_{F3}T_{T1} + k_{F4}T_{T2}$$

where $k_{F0}$ to $k_{F4}$ are coefficients to be determined in the filter characteristic setting step 105. With this filtering calculation, a specific frequency component of the estimated torque $T_T$, being an input, is damped with a predetermined damping factor $\rho$. If the throttle control is executed with this damped output $T_F$ being used as the target torque, the vehicle hunting does not occur.

As described above, in this embodiment, there is included a filter characteristic of FIG. 9B where the damping occurs above the high-frequency region f1. If f1 is reduced, the rising of the vehicle G becomes dull, while, if enlarged, the rising thereof becomes rapid. Thus fi can be changed so as to freely select the ride feeling such as sporty ride feeling of a sharp rising and high-class and comfortable ride feeling of a relatively slow rising. This is switchable by the operation of the sports mode switch 82 disposed near the vehicle driver.

Figure 21:
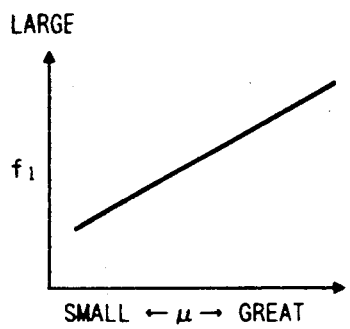
FIG. 21 is an illustration of the relation between the frictional coefficient $\mu$ of the road surface and the high-frequency region f1.
Figure 22:
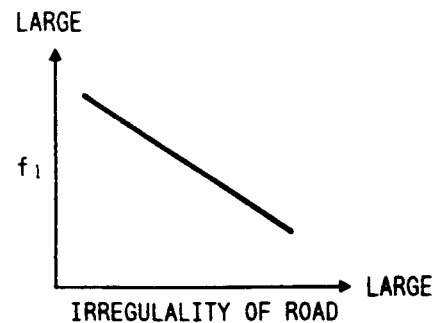
FIG. 22 is an illustration of the relation between the irregularity of the road surface and the high-frequency region f1.

Further, in order to prevent a rapid acceleration on a slippery road surface, it is appropriate to detect the frictional coefficient $\mu$ of the road surface to set f1 in accordance with the coefficient $\mu$ as illustrated in FIG. 21. As obvious from the characteristic of FIG. 21, it is preferable that f1 is set to be greater as $\mu$ is greater. Furthermore, it is also appropriate that, as illustrated in FIG. 22, the characteristic is switched so that f1 becomes smaller as the degree of the irregularity of the road surface is higher, thereby allowing the automatic selection between the slow acceleration and the rapid acceleration. The environment variables such as the frictional coefficient $\mu$ and irregularity of the road surface will be described hereinafter.

Figure 23:
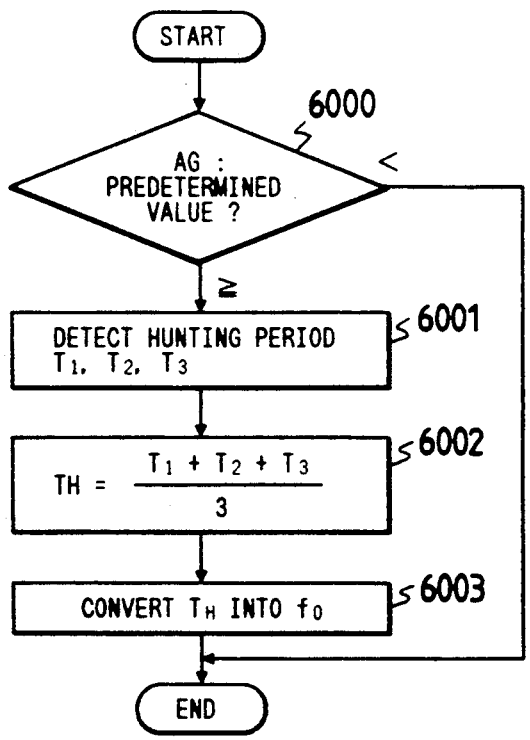
FIG. 23 is a flow chart for calculating the natural frequency fo.

Here, since the natural frequency (hunting frequency) fo varies due to the environment variation, variation of the engine or vehicle with passage of time, or characteristic variation, a more preferable controllability can be realized with learning. It is appropriate that as the larning method the acceleration G in the forwarding and backwarding directions of the motor vehicle is detected by means of a G-sensor to calculate the hunting period to be reflected to the natural frequency fo. FIG. 23 is a flow chart thereof. In FIG. 23, a step 6000 is first executed in order to calculate the hunting amplitude AG on the basis of the detected vehicle G to check whether the hunting amplitude exceeds a predetermined value (whether the hunting occurs). If AG≧the predetermined value, the control goes to a step 6001 to calculate the previous three hunting periods $T_1$, $T_2$ and $T_3$. A subsequent step 6002 is for obtaining the average value $T_H$ of the calculated hunting periods $T_1$, $T_2$ and $T_3$, then followed by a step 6003 to obtain fo on the basis of $T_H$ (fo = 1/$T_H$) in a step 6004.

Secondly, a description will be made hereinbelow with reference to FIG. 24 in terms of the decision of the condition in the step 1030 of FIG. 2. In a step 4001, since as described above the pedal operating amount due to the vehicle driver can vary by the vibration in the forwarding and backwarding directions of the motor vehicle resulting from the road surface disturbance, the condition is determined so as not to be satisfied at the time of the steady-state running where the vehicle driver does not perform the acceleration or deceleration operation. The decision of the steady-state running is made in accordance with a flow chart illustrated in FIG. 25A. FIG. 25B is an illustration for showing the execution of the FIG. 25A flow chart. That is, in FIG. 25B, the variation Ap of the accel-operating amount per a predetermined time is calculated on the basis of the accel-operating amount Ap and the previous value Ap thereof. A step 7001 follows to determine the start of the acceleration when $|\dot{A}p| \geq$ a predetermined value $\dot{A}po$ ($\dot{A}po > 0$), then followed by a step 7003 to set the execution flag XF in the step 1040 to the ON state, and further followed by a step 7004 to set a counter CF (CF = 0).

On the other hand, when the answer of the step 7001 is $|\dot{A}p| < \dot{A}po$ and further the execution flag XF in the step 7002 is XF = OFF, the decision is made such that the motor vehicle is in the steady state or in a slowly accelerated state so as not to require the step 1040, and hence the flag XF is kept to XF = OFF as it is. When $\dot{A}p < \dot{A}po$ and XF = ON, because there is still the possibility that the vehicle is in the accelerating state, the operation advances to a step 7005 so as to check whether the vehicle is in the accelerating state. In the step 7005 the decision of the accelerating state is made for a predetermined time To (for example, 0.5 seconds) after the accel is operated at a speed of $|\dot{A}p| \geq \dot{A}po$, and the decision of the non-accelerating state is made after elapse of the predetermined time To. That is, in the step 7005 a counter CXF is compared with a value kCXF corresponding to the predetermined time To. If CXF ≥ kCXF, a step 7006 follows to set XF = OFF under the determination of being not in the accelerating state, then followed by a step 7007 to update (increment) the counter CXF. With the procedure illustrated in FIG. 25A, the control checks the vehicle is in the steady-state running so that the execution is not made at the time of the steady-state running, and therefore it is possible to prevent the misjudgment where the decision of the accelerating state is made in response to the fact that $|\dot{A}p|$ instantaneously becomes a large value due to the road surface disturbance.

Further, in a step 4002, the non-satisfaction of the condition is decided when the frictional coefficient $\mu$ is smaller than a predetermined value $\mu_o$. At the time of the deceleration, it is dangerous to open the throttle valve irrespective of no operation of the pedal. For the detection of the frictional coefficient $\mu$, the intake air temperature (atmospheric temperature) due to the intake air temperature sensor can be so substituted that the decision is made such that the coefficient $\mu$ is small when the intake air temperature ≤ a predetermined value. Moreover, the driven-wheel acceleration degree at the time of the driven wheel being in the slipping state can be substituted so that $\mu \leq \mu_o$ is determined when the acceleration degree at the time of the slippage of teh driven wheel is greater than a predetermined value.

In a step 4003, since there is the possibility that the execution of the step 1040 of FIG. 2 enlarges vibration when the degree of the irregularity of the road surface is greater than a predetermined value (for example, in the case of running on a gravel road surface), the non-satisfaction of the condition is decided. This decision is made by taking into account the fact that, because in the conversion process of $T_F$ into $\theta$ the throttle valve is overshot, when the pedal moves synchronously due to the disturbance (irregularity) of the road surface, the motor vehicle can lose the steady-state stability. The irregularity of the road surface can be determined on the basis of the vehicle G due to the G-sensor. When the vehicle G is in a high-frequency hunting state, the magnitude of the hunting amplitude is determined as the degree of the irregularity.

Figure 26:
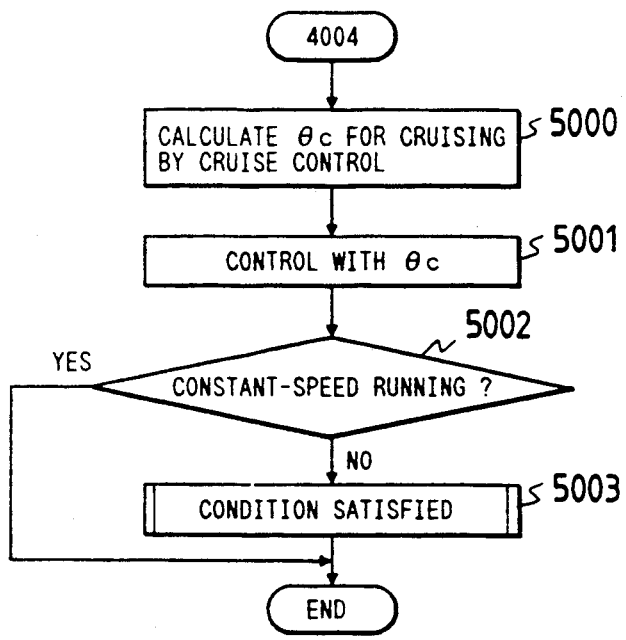
FIG. 26 is a flow chart for describing the step 4004 of FIG. 24.

In a step 4004, the condition is not satisfied when the motor vehicle is under the auto-crusing control (the automatic low-speed running control), i.e., when the auto-cruising switch 81 is in the ON state. This is because Ap = 0. However, with the treatment of a flow chart at the time of the auto-cruising control shown in FIG. 26, it is also possible to perform the processes after the step 1040 irrespective of being under the cruising control. Thus, it is possible to prevent the vehicle vibration at the time of the start of the auto-cruising control or at the time of the change of the set vehicle speed. That is, in FIG. 26, the target opening degree $\theta$c for the cruising is normally calculated in a step 5000, then followed by a step 5001 to drive the throttle valve 7 on the basis of the target opening degree $\theta$c. A step 5002 is provided for checking whether the motor vehicle is actually in the constant-speed running state where the vehicle speed is stable. This can be achieved by checking the deviation relative to the auto-cruising set vehicle speed. Only when the vehicle is not running at a low speed, a step 5003 is executed so as to satisfy the torque correction condition. Here, $\theta$c is not used but $\theta$ is used. In a step 4005, similarly, the condition is not satisfied at the time of execution of the traction control. This is because it is required to preferentially perform the slip suppression. In a step 4006, similarly, the condition is not satisfied at the time of the failure of the pedal sensor, throttle body and others. This is because of preferentially performing the failure treatment.

Moreover, in a step 4007, since the engine torque generally varies in accordance with the air-fuel ratio (A/F), it is preferable that the correction is made in accordance with the A/F so as to determine the estimated torque $T_T$, or the fuel increasing or the non-synchronous injection is merely performed at the time of the lean state and the fuel-decreasing correction is effected at the time of the rich state. In addition, if it is not in a range of 10 ≤ A/F ≤ 20, since there is the possibility that the estimated torque $T_T$ does not become as illustrated in FIG. 3A, the non-satisfation of the condition can be decided when the A/F is out of a predetermined range, thereby preventing deteriorating the vehicle ride feeling due to scattering of the actual torque.

In a step 4008, although as described above the estimated torque $T_T$ is previously determined in correspondance with the engine temperature, no satisfation of the condition can be made when the cooling water temperature $T_H \leq$ a predetermined value $T_{Ho}$ becuase there is the possibility that the actual torque scatters. In a step 4009, when the motor vehicle is in the unloaded state having no connection with the vehicle vibration, the condition is not satisfied. The detection at the time of the unloaded state is effected on the basis of the ON/-OFF state of the clutch sensor 42a and a gear position signal from the gear position sensor 27a. More specifically, the decision of the unloaded state is made when the clutch is depressed (the clutch sensor 42a is in the ON state) and the gear position signal is indicative of the neutral state.

In a step 4010, the condition is not satisfied when performing the braking operation, because it is dangerous that the throttle valve 7 is opened under the deceleration control. The detection of the braking operation is performed by the brake sensor 43a. In a step 4011, the decision is made such that the condition in the torque correction condition decision step 1030 of FIG. 2 is satisfied, thereby proceeding to the step 1040 of FIG. 2. In a step 4012, the decision is made such that the torque correcting condition is not satisfied, thereby advancing to the step 1070 of FIG. 2. In the step 1070, normally the target opening degree $\theta$ of the throttle valve 7 is obtained on the basis of the accel-operating amount Ap and the speed Ne in accordance with the map illustrated in FIG. 3B. Here, instead of the target opening degree $\theta$, the traction target opening degree is used at the time of the execution of the traction control and the above-mentioned cruising target opening degree $\theta c$ is used at the time of the execution of the auto-cruising control.

Although the description of this embodiment has been made in terms of a manual transmission (MT) type motor vehicle, this invention can also be employed for an automatic transmission (AT) type motor vehicle. However, this invention may have no connection with a motor vehicle not equipped with a lock-up mechanism, because the vehicle vibration does not occur due to the internal slip of the torque converter.

With the execution of the step 1040 of FIG. 2, the filtering is automatically effected when the variation $\dot{T}_T$ of the estimated torque $T_T$ is great, that is, when the variation $\dot{A}p$ of the accel-operating amount Ap is large, and a target torque $T_F$ having a characteristic as illustrated in FIG. 36A can be obtained at the time of the accelerating operation. In addition, with the throttle opening degree being controlled through the step 1050, the throttle opening degree $\theta$ at the time of a rapid accelerating operation shows a characteristic to the FIG. 36A characteristic where the opening degree decreases after being once increased, before again increasing, so that the acceleration G in the forwarding and backwarding directions of the motor vehicle scarcely shows hunting but varies stepwise in accordance with the accel-operating amount Ap. Such an acceleration characteristic allows, to the vehicle driver, a smooth acceleration sensation like the feeling immediately before the taking-off of an airplane which does not includes great vibration, and further satisfies an excellent controllability united with the will of the vehicle driver. Moreover, even if the motor vehicle is in a rapid accelerating state, the throttle opening degree is controlled so that the engine torque is kept constant at least one time or the increasing speed of the engine torque beomes low. Further, similarly at the time of the deceleration, the filter having the characteristic as illustrated in FIG. 10 can realize a smooth deceleration characteristic not providing great vibration.

Figure 27A:
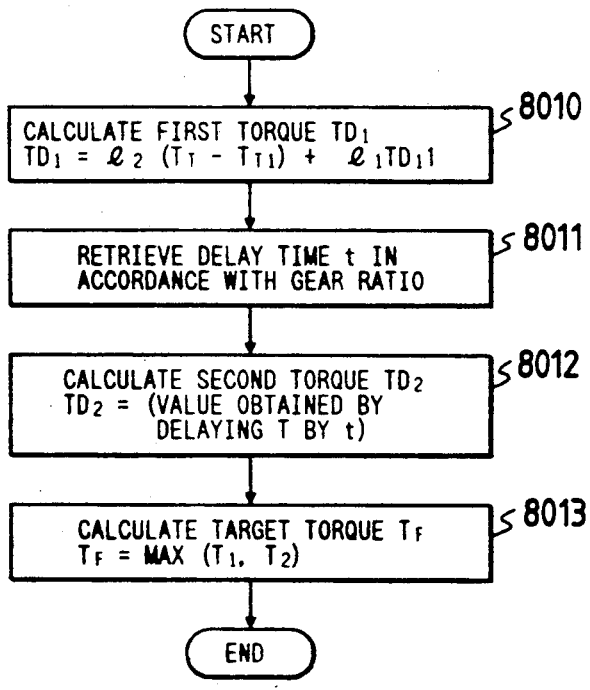
FIGS. 27A and 27B are illustrations for describing a second embodiment of the step 1040 in FIG. 2.
Figure 27B:
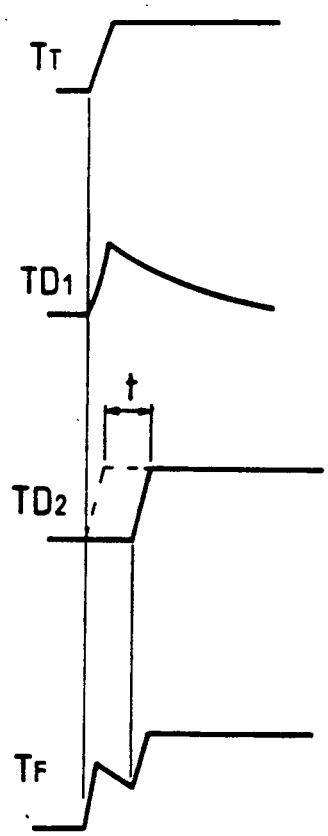
Figure 28:
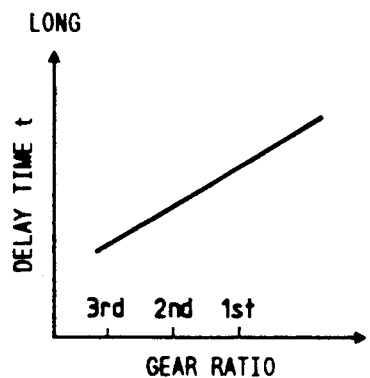
FIG. 28 is an illustration of the relation between the transmission gear ratio and the delay time t.

Secondly, a description will be described hereinbelow in terms of a second embodiment of the step 1040 of FIG. 2 for correcting the estimated torque $T_T$ so as to calculate the target torque $T_F$. Here, on the basis of the waveform of the estimated torque $T_T$, the waveform of the target torque $T_F$ having a two-step configuration as illustrated in FIG. 36A is produced with a process simpler than the filtering process. The detailed process is shown by a flow chart of FIG. 27A and a timing chart of FIG. 27B. In a step 8010, on the basis of the waveform of the estimated torque $T_T$, a first torque waveform TD1 is calculated in accordance with an equation, i.e., $TD_1 = l_2(T_T - T_{T1}) + l_1 TD_11$ where $T_{T1}$ is the previous value of $T_T$ and $TD_11$ is the previous value of $TD_1$. When the estimated torque $T_T$ stepwise varies, the waveform of this $TD_1$ varies up to a level to be determined by the constant $l_2$ depending on the vehicle operating variable, before decreasing with the damping factor constant $l_1$. Further, in a step 8011, a delay time t corresponding to the change gear ratio is detected in accordance with a map illustrated in FIG. 28. Here, the delay time t is calculated by $(1/fo) \times (\frac{1}{2})$, while the time t has the characteristic as illustrated in FIG. 28 because as described above the value of fo becomes smaller in accordance with the reduction of the change gear ratio. In a subsequent step 8012, a second torque waveform $TD_2$ is calculated as a value obtained by delaying the waveform of the estimated torque $T_T$ by the delay time t. A step 8013 is finally executed so as to calculate the target torque $T_F$ by selecting the greater one of the values of the first and second torque waveforms $TD_1$ and $TD_2$ calculated in the previous steps 8010 and 8012. It is also appropriate that $T_F$ is merely calculated as $TD_1 + TD_2$. Thus, since the value of TD1 is obtained on the basis of the previous $TD_1$ and $T_T$, the target torque $T_F$ can be calculated with an extremely simple logic even if the final level of the present estimated torque is not obvious.

Figure 29:
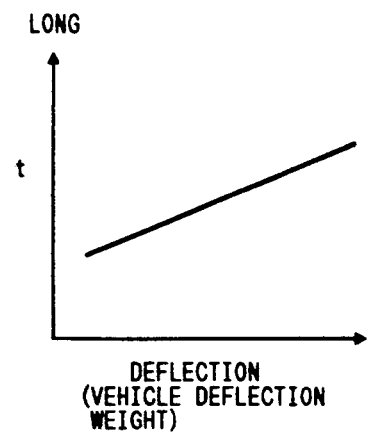
FIG. 29 shows the relation between the deflection amount of the suspension and the delay time t.
Figure 30:
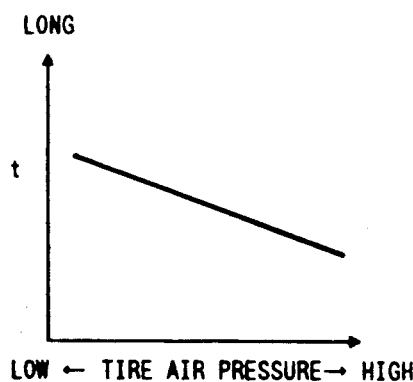
FIG. 30 shows the relation between the air pressure of the tire and the delay time t.
Figure 31:
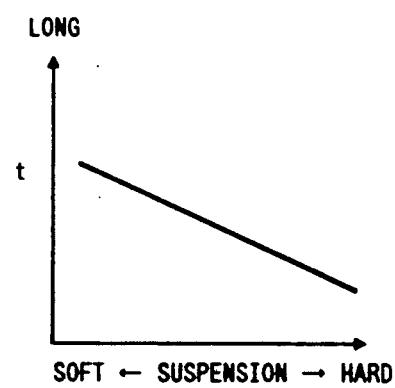
FIG. 31 shows the relation between the hardness of the suspension and the delay time t.

Here, since as described above the natural frequency fo by which the hunting of the motor vehicle occurs varies in accordance with the vehicle variables such as the mounted load of the vehicle, tire air pressure, change of the hardness of the suspension (now, a two-step switching, hard and soft, type device is currently put to practical use), it is preferable to perform the following correction with respect to the delay time t. That is, it is preferable that as illustrated in FIGS. 29 to 31, the delay time t is set to be longer as the deflection amount of the suspension increases, and the time t is set to be shorter as the tire air pressure is higher, and the time t is set to be shorter in accordance with increase in the hardness of the suspension.

Similarly, according to this second embodiment, at the time of the rapid acceleration operation, the throttle opening degree is once closed before being again opened so as to allows the stepwise control, thereby realizing the acceleration performance like the taking-off of an airplane. Further, similarly, at the time of the rapid deceleration operation, the characteristic of the target torque $T_F$ shows a two-step configuration so as to realize a smooth deceleration. In terms of the fact that as shown in FIG. 36A the ratio $t_o r_o / t_o r$ of the average level $t_o r_o$ of the target torque $T_F$ for the time t that the target torque decreases at the time of the acceleration and the final converging level $t_o r$ varies in accordance with the driving state, it is possible to obtain the target torque characteristic extremely close to that of the above-described first embodiment.

Figure 24:
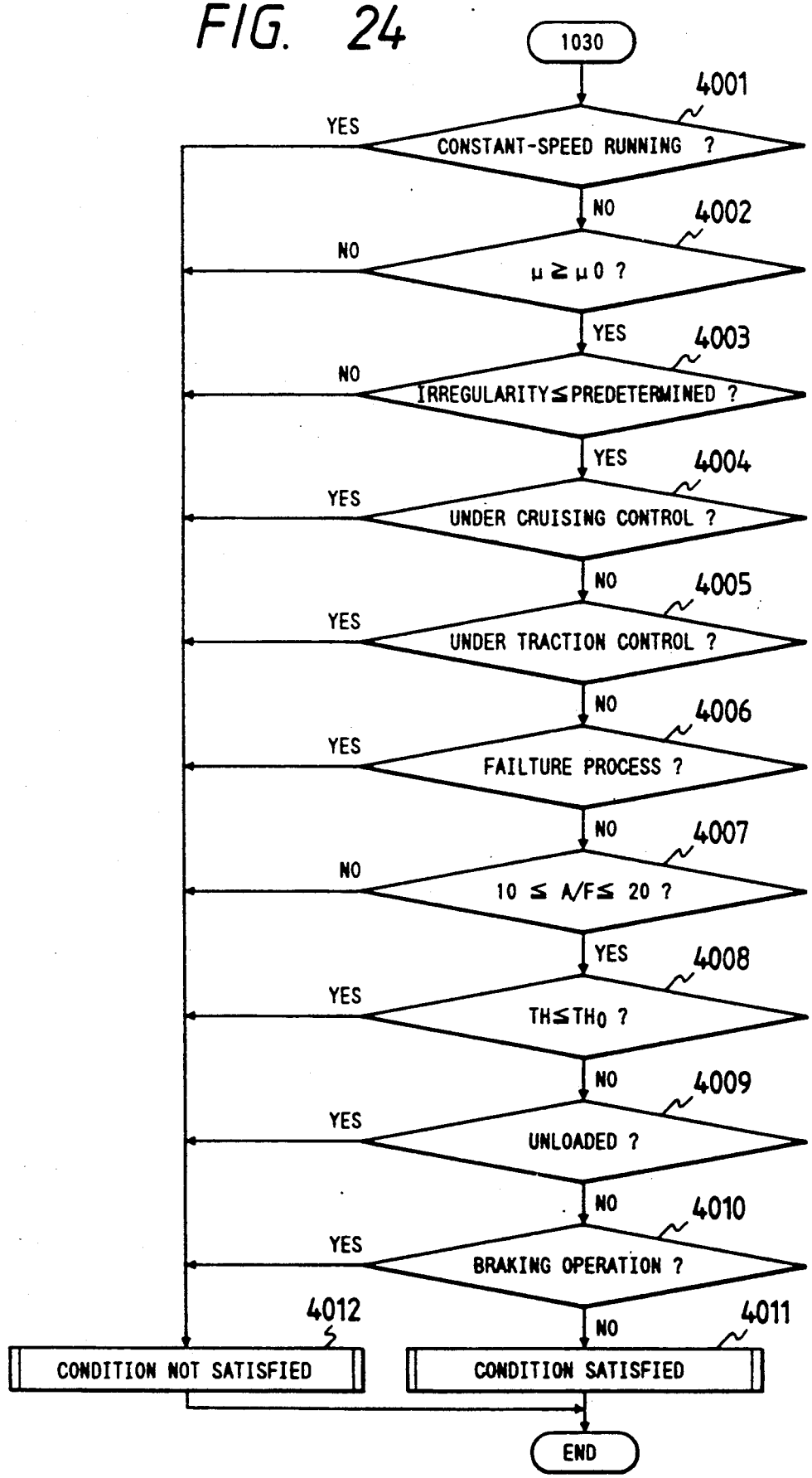
FIG. 24 is a flow chart for describing the step 1030 in FIG. 2.
Figure 25A:
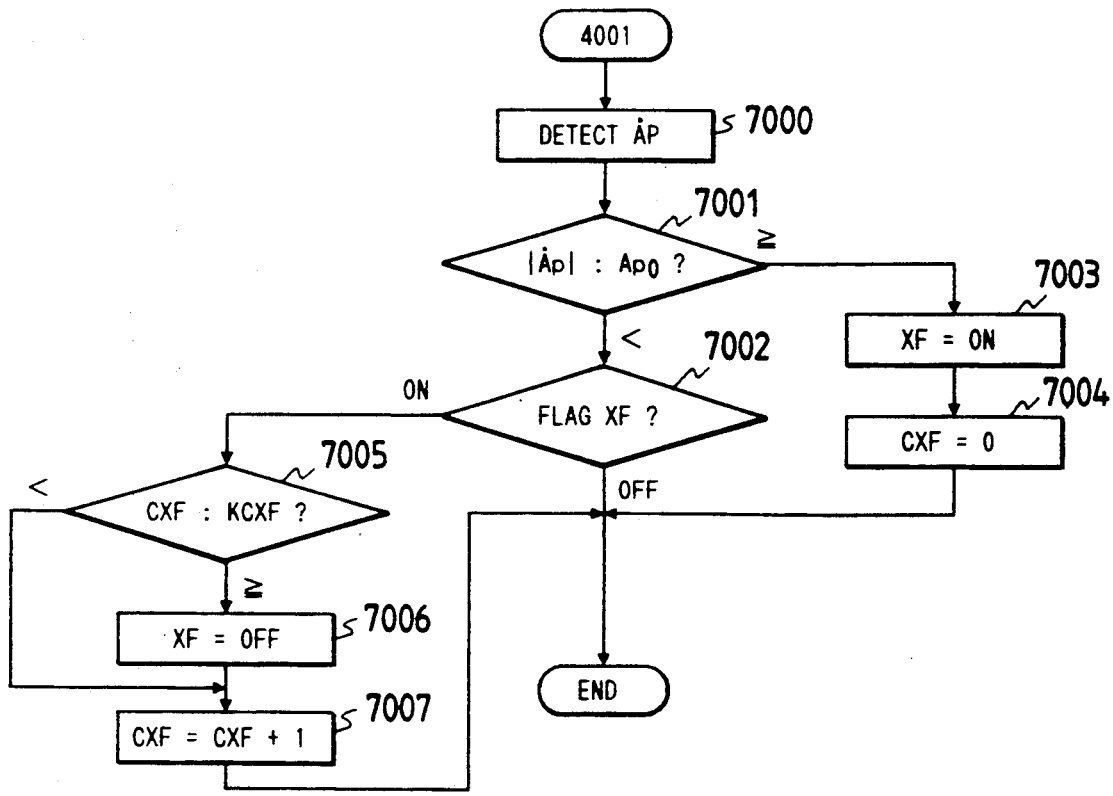
FIGS. 25A and 25B are illustrations for describing the step 4001 in FIG. 24.
Figure 25B:
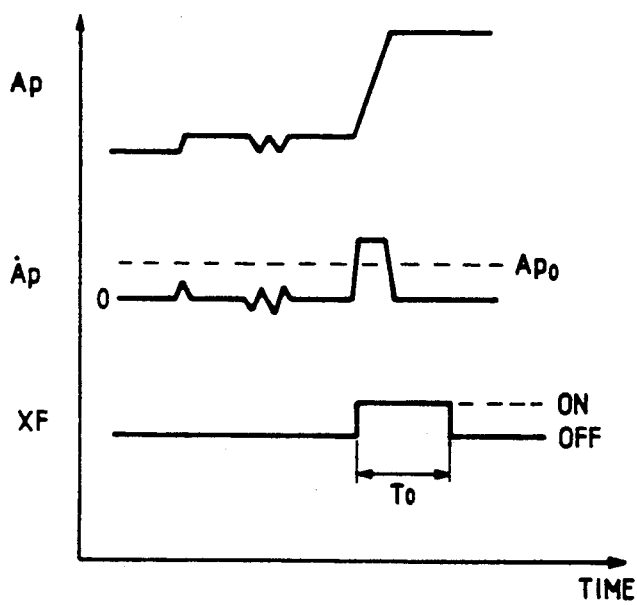

According to this second embodiment, in the step 4001 of FIG. 24, it is not required to decide the steady-state running as illustrated in FIG. 25A. That is, in the case that the accel-operating amount Ap does not vary rapidly, the target torque $T_F$ is not calculated originally so as to has a stepwise configuration. Accordingly, the step 4001 can be omitted.

In the above-described first and second embodiments, it is appropriate that the engine torque is controlled so as to have the two-step configuration only at the time of either the acceleration or deceleration. Further, the torque control is not limited to only the throttle operation but can be effected additionally under the fuel control, ignition control, EGR control, braking control, exhaust pressure control, supercharging pressure, variable valve timing control (VVT) and others. Since limitation is imposed upon the throttle response, there is the possibility that the necessary torque cannot be realized by the throttle operation. Thus, it is possible to obtain a more excellent controllability by compatibly or additionally using a torque-controllable system other than the throttle system.

Figure 32:
FIG. 32 is a graphic illustration for describing the variation of the throttle opening degree $\theta$ at the time of the acceleration and deceleration due to this invetnion.

FIG. 32 shows a throttle opening degree $\theta$ to be controlled by executing this invention at the time of both the acceleration and deceleration to calculate the target orque $T_F$. In regions A, C and E the torque-increasing control is compatibly effected, and in regions B, D and F the torque suppressing control is compatibly effected. The compatible torque-increasing control and torque-suppressing control will be described hereinbelow.

Figure 33:
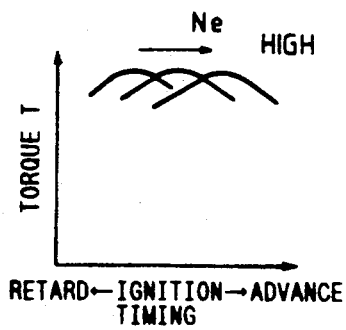
FIG. 33 is an illustration of the relation between the ignition timing and the engine torque.
Figure 34:
FIG. 34 is an illustration of the relation between the EGR rate and the engine torque.
Figure 35:
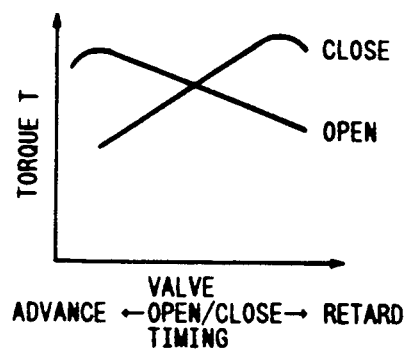
FIG. 35 shows the relation between the opening/closing timing of the intake/exhaust valve and the engine torque.

Torque-Increasing Control 1) fuel control : increasing the torque by increasing the fuel amount;

2) ignition control : controlling the ignition timing to cause the torque to take a peak, because the relation between the ignition timing and the torque is generally as illustrated in FIG. 33;

3) EGR control : increasing the torque by fully closing the EGR control valve 75 to prohibit the EGR, because the relation between the EGR rate and the torque becomes as illustrated in FIG. 34;

4) supercharging pressure control : increasing the torque by fully closing the supercharging pressure control valve 70 to increase the supercharging pressure; and 5) VVT : controlling the valve opening/closing timing to cause the torque to take a peak, because the relation between the valve opening/closing timing and the torque is generally as illustrated in FIG. 35, that is, the torque is more increased in accordance with the opening timing more advancing and the closing timing more retarding.

Torque Suppressing Control 1) fuel control : effectively suppressing the torque by cutting the fuel or by controlling the air-fuel ratio (A/F) to the lean side;

2) ignition control : suppresing the torque by retarding the ignition timing;

3) EGR control : suppressing the torque by increasing the EGR rate through the valve 75;

4) braking control : suppressing the torque to be applied to the wheel with the braking hydraulic pressure being heightened;

5) exhaust pressure control : suppresing the torque by heightening the exhaust pressure with the valve 73 being controlled to the closing side; and 6) VVT : controlling the torque by retarding the opening timing of the respective intake/exhaust valves and advancing the closing timing thereof.

Speed-Change Control Operation of Automatic Transmission

Figure 37:
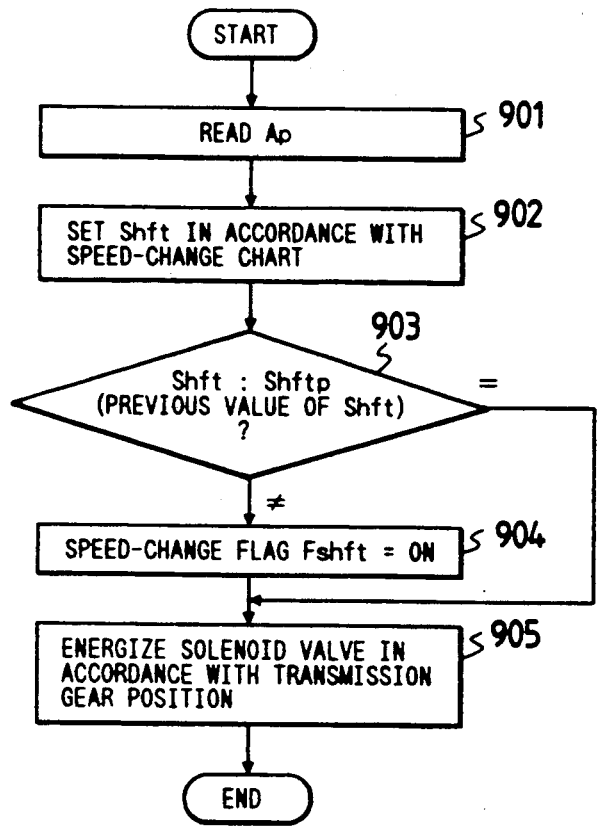
FIG. 37 is a flow chart showing the speed-changing control operation of the torque converter (automatic transmission) with a lock-up mechanism.
Figure 38:
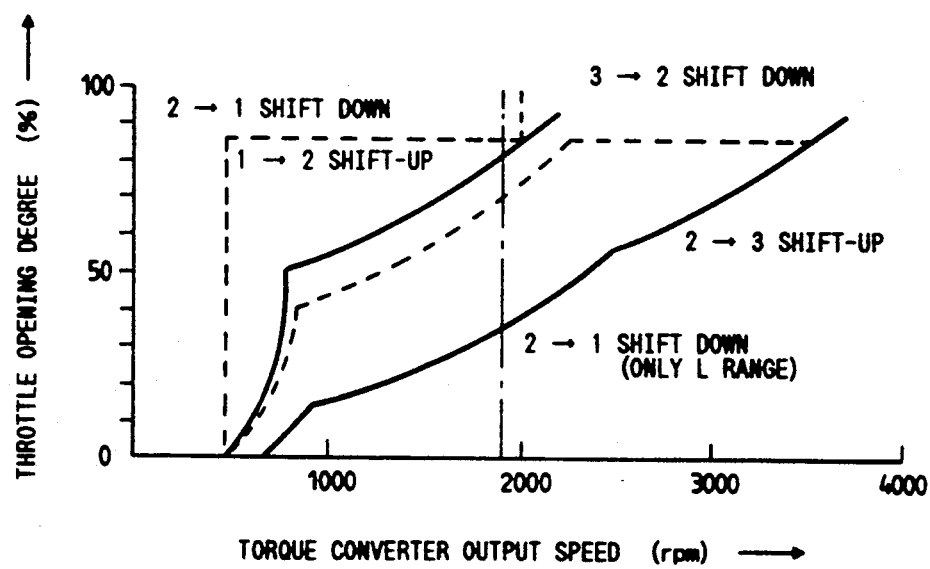
FIG. 38 shows the speed-changing timing of the rotational speed of the torque converter output and the opening degree of the throttle valve on a tow-dimensional space.

Secondly, a description will be made with reference to a flow chart of FIG. 37 in terms of the speed-change control operation of the torque converter (automatic transmission) 25 equipped with a lock-up mechanism. In FIG. 37, the operation starts with a step 901 to read the accel-operating amount Ap and the vehicle speed SPD, then followed by a step 902 to set a transmission gear position (shift position) Shft in accordance with a speed-change chart as illustrated in FIG. 38. In this speed-change chart there is a hysteresis between the shift-down operation and the shift-up operation. In a step 903 the transmission gear position Shft is compared with the previous value Shftp of transmission gear position. If the transmission gear position Shft is coincident with the previous value Shftp, the operation jumps to a step 905. On the other hand, if not coincident with the previous value Shftp, the operation advances to a step 904 under the consideration that the gear positon is changed, thereby setting a speed-change flag Fshft to the ON state, thereafter followed by the above-mentioned step 905. Here, the setting of the speed-change flag Fshft to the OFF state is made on the lock-up control which will be described hereinafter. In the step 905, irrespective of the speed-change being performed or not, the speed-change solenoid-operated valve 27a is energized in accordance with the setting of the transmission gear position. Generally, three speed-change solenoid-operated valves 27a are provided so as to determine the transmission gear position through the combination thereof (in FIG. 1, the three solenoid-operated valves are shown at 27a).

Lock-up Control

Figure 39:
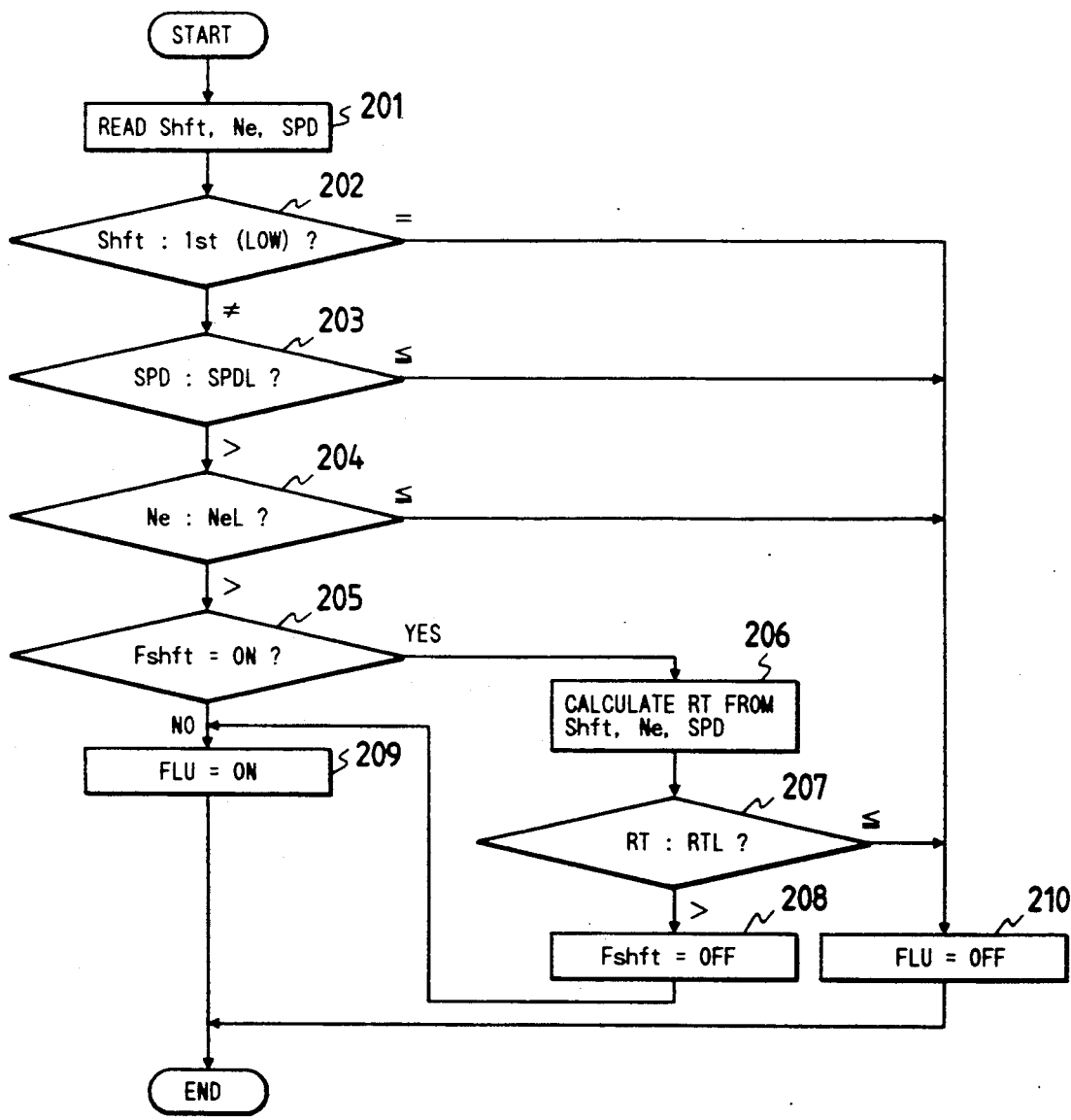
FIG. 39 is a flow chart showing the lock-up control.

Further, the lock-up control operation will be described hereinbelow with reference to a flow chart of FIG. 39. This flow chart is for deciding the execution of the lock-up control. In FIG. 39, the operation starts with a step 201 to read the transmission gear position Shft, the vehicle speed SPD and engine speed Ne, then followed by a step 202 to check whether the transmission gear position is the first position (LOW), further followed by a step 203 to check whether the vehicle speed SPD is below a predetermined value SPDL, and thereafter followed by a step 204 to check whether the engine speed Ne is below a predetermined value NeL. If the transmission gear position Shft is the first position, or if the vehicle speed SPD is below the predetermined value SPDL, or if the engine speed Ne is below the predetermined value NeL, the operation goes to a step 210 in order to release (OFF) the lock-up and, at the same time, to turn OFF a lock-up flag FLU. This is because of the satisfaction of the above-mentioned conditions permits the estimation that the motor vehicle is in the starting state, and for preventing the stopping of the engine due to the engine rotating at a low speed.

A subsequent step 205 is for checking whether the motor vehicle is in the speed-changing state, that is checking whether the speed-change flag Fshft is the ON state. If the step 205 decides that the speed-change flag Fshft is OFF, a step 209 follows so as to perform the lock-up control and to set the lock-up flag FLU to ON. On the other hand, if the step 205 decides that the motor vehicle is in the speed-changing state (speed-change flag Fshft=ON), a step 206 follows to calculate the torque converter input/output rotation ratio RT on the basis of the gear ratio corresponding to the transmission gear ratio Shft, engine speed Ne and vehicle speed SPD. Here, torque converter input/output rotation ratio RT is determined to be gear ratio×SPD/Ne. Thus, when the torque converter input/output rotation ratio RT is substantially 1, the torque converter slip is small, and when the torque converter input/output rotation ratio is above 2, the torque converter slip is large.

Subsequently, in a step 207 the torque converter input/output rotation ratio RT is compared with a predetermined value RTL. If RT≦RTL, the decision is made such that the torque converter slip is large, the operation advances to the step 210 so as to set the lock-up to OFF. On the other hand, when RT>RTL, the decision can be made such that the torque converter slip is small, and hence the operation proceeds to a step 208 to set the speed-change flag Fshft to OFF and further proceeds to the step 209 to release the lock-up and further to set the lock-up flag FLU to ON.

In the above-described control operation, the reason that the lock-up is not performed during the speed-changing operation (Fshft =ON) is to prevent the vehicle shock (speed-change shock). More specifically, if the speed-changing operation is effected when the motor vehicle is in the lock-up state, the vehicle shock which is so-called speed-change shock occurs due to the rotational difference caused by the speed-changing operation. If releasing the lock-up, the torque converter absorbs the shock so as to reduce the speed-change shock. That is, the time period, that in the step 207 (FIG. 38) the reduction of the slip of the torque converter 25 is detected after in the step 904 (FIG. 37) the detection is made in terms of the speed-change flag Fshft=ON (instruction of the speed-change), is decided as the speed change time period (the time period of Fshft=ON), thereby setting the lock-up to OFF. This is because, if the lock-up is effected when the torque converter slip is large, the vehicle shock becomes large as well as the speed-change shock.

Throttle Control at the time of Lock-Up Operation

Figure 40:
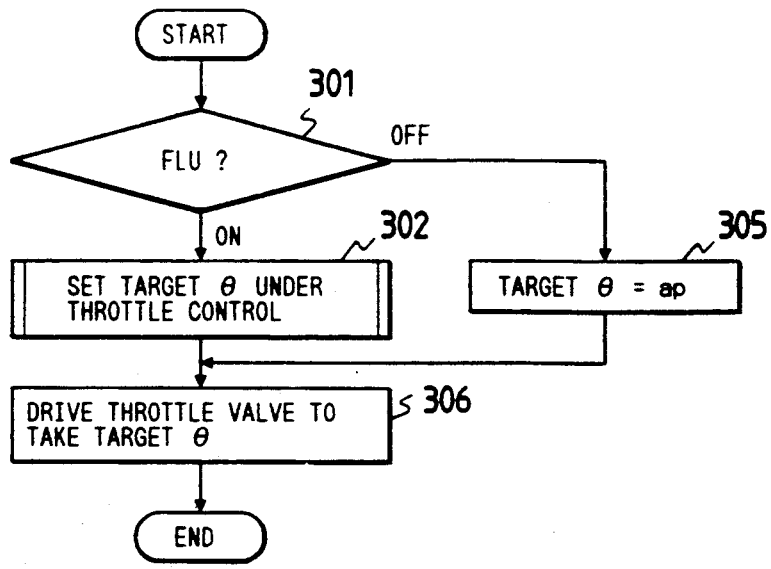
FIG. 40 is a flow chart showing the throttle control at the time of the lock-up operation.
Figure 41:
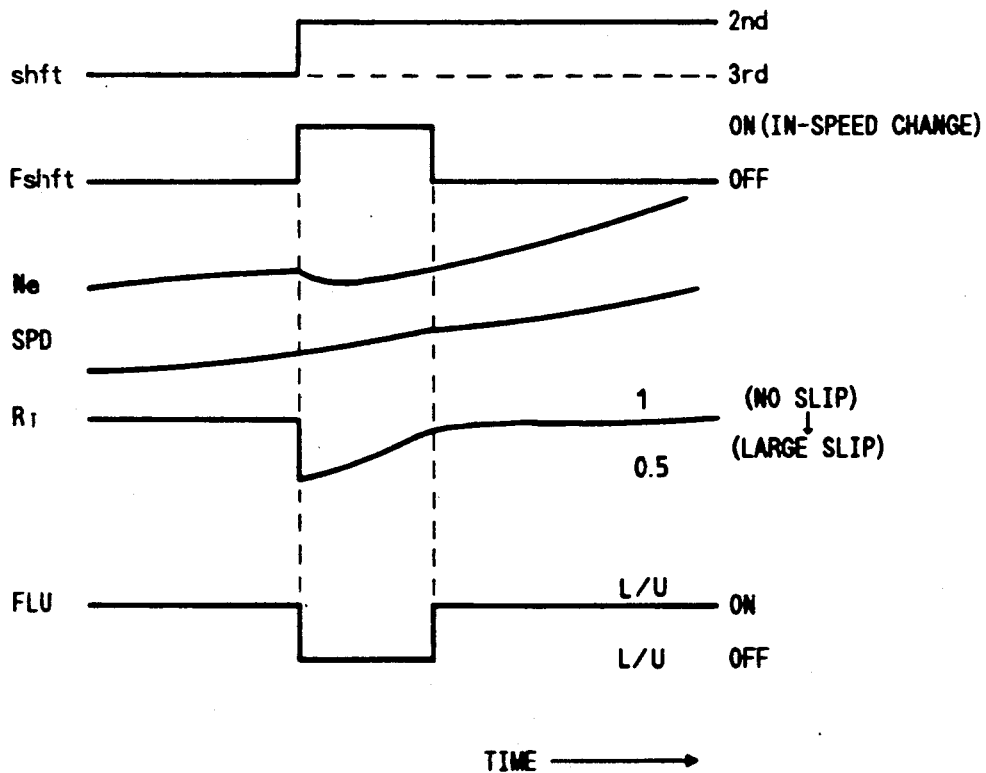
FIG. 41 is a timing chart of the respective signals in FIGS. 37 to 40.

A description will be made hereinbelow with reference to a flow chart of FIG. 40 in terms of the throttle control at the time of the lock-up operation. The control starts with a step 301 to check the lock-up flag FLU to decide whether the motor vehicle is in the lock-up state. If in the lock-up state (FLU=ON), a step 302 follows to set the target throttle opening degree θ under the vehicle resonance reducing throttle control (the throttle control for the vehicle resonance reduction purpose described with reference to FIGS. 2 to 36), then followed by a step 306. On the other hand, if in the step 301 the lock-up is the OFF state, the operation advances to a step 305 to set the target throttle opening degree θ to the accel-operating amount Ap, thereafter followed by a step 306 to drive the throttle valve 7 in accordance with the set target throttle opening degree θ. FIG. 41 is a timing chart showing signals for the speed-change control, lock-up control and throttle control at the time of the lock-up operation. In FIG. 41, in the case that the transmission gear position Shft varies from the first position (2nd) to the third position (3rd) so that the speed-change flag Fshft turns to ON, when the torque converter input/output rotation ratio RT to be calcualted on the basis of the engine speed Ne and the vehicle speed SPD becomes the predetermined value RTL (which is about 1), the speed-change flag Fshft returns to OFF. The lock-up flag FLU reversely operates with respect to the speed-change flag Fshft at the time other than the first position. Further, the target throttle opening degree θ is set to the accel-operating amount Ap when the speed-change flag Fshft is in the ON state and is determined in accordance with the step 302 when the speed-change flag=OFF.

Figure 49:
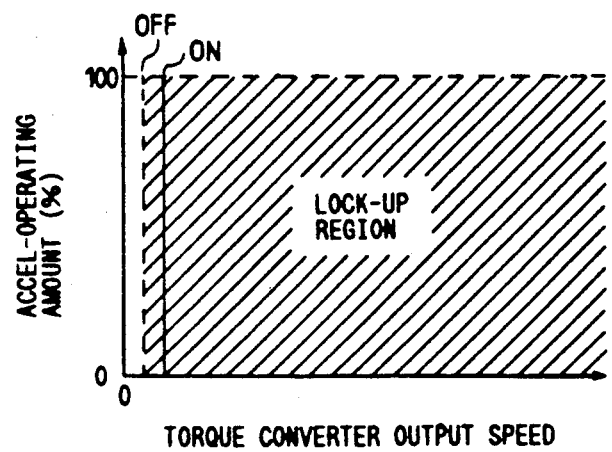
FIG. 49 shows the lock-up region due to the FIG. 37 lock-up control.
Figure 50:
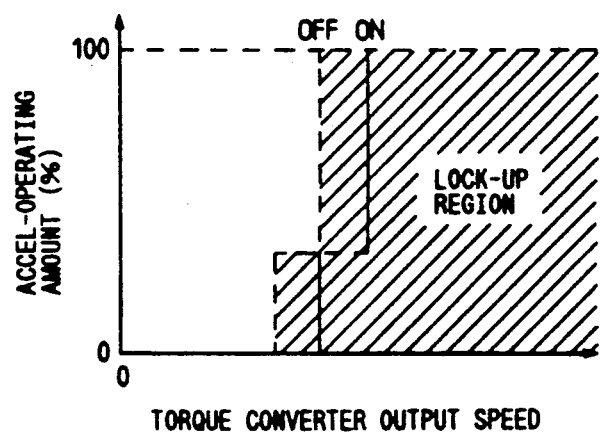
FIG. 50 illustrates the lock-up region due to conventional lock-up control.
Figure 51A:
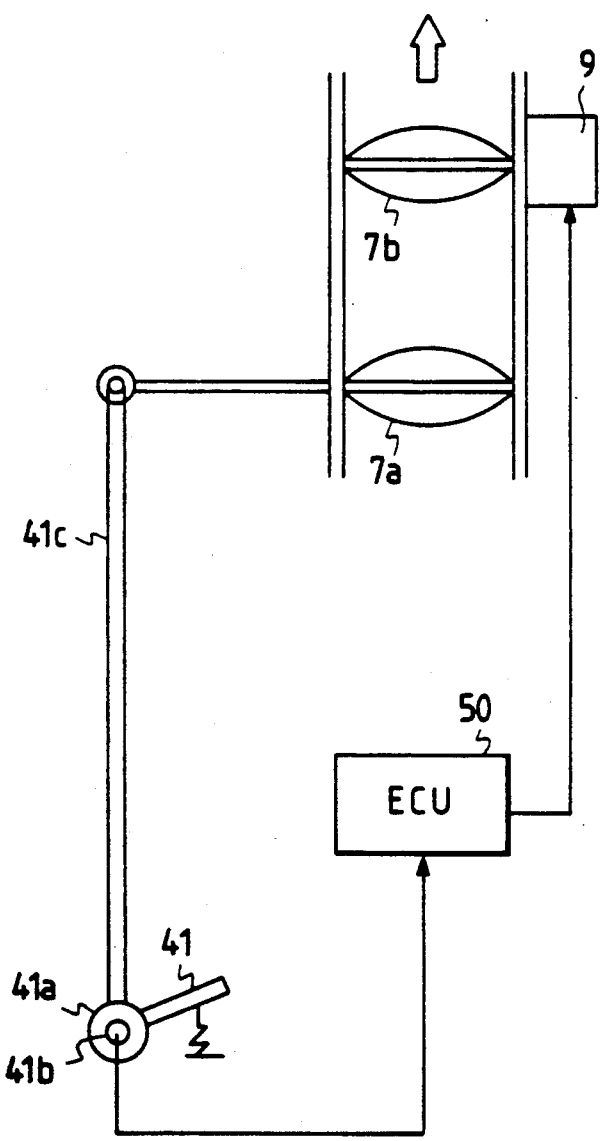
FIGS. 51A and 51B are illustrations for describing a further embodiment of this invention.
Figure 51B:
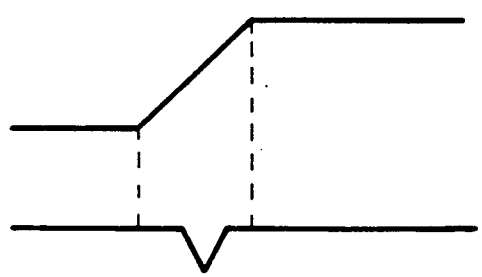

As described above, in this embodiment, even at the time of the acceleration and deceleration operation and the low-speed running, except for the speed-change and the vehicle start, the lock-up is compulsorily performed (see FIG. 49), and the vehicle resonance reducting control (FIGS. 2 to 36) is performed when the motor vehicle is in the lock-up state, thereby allowing both the fuel consumption improvement and driveability improvement. As compared with this operation, in the conventional lock-up control, the lock-up is not effected when the motor vehicle is running at a low speed, and in addition the engine speed for starting the lock-up is set to be a higher value at the time of the accel-operating amount being large, for example, at the time of the acceleration operation, (see FIG. 50). Here, the reason that the lock-up is not effected at the time of the speed-changing operation is to prevent the speed-change shock, and the reason that the lock-up is not effected when the torque converter slip is large is to prevent the vehicle shock due to the lock-up.

Figure 47:
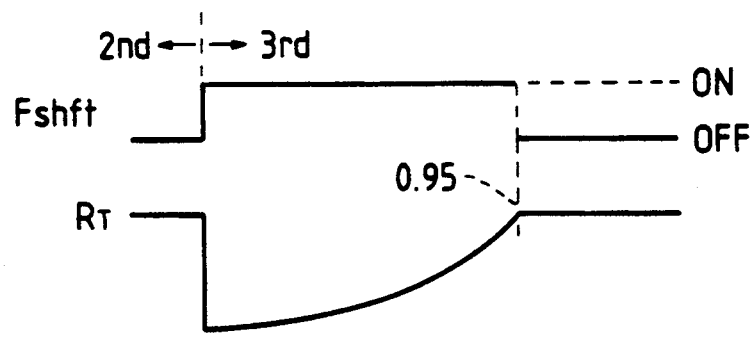
FIGS. 47 and 48 are timing charts of the signals in the speed-changing control operation of the torque converter (automatic transmission) with a lock-up mechanism illustrated in FIG. 37.
Figure 48:
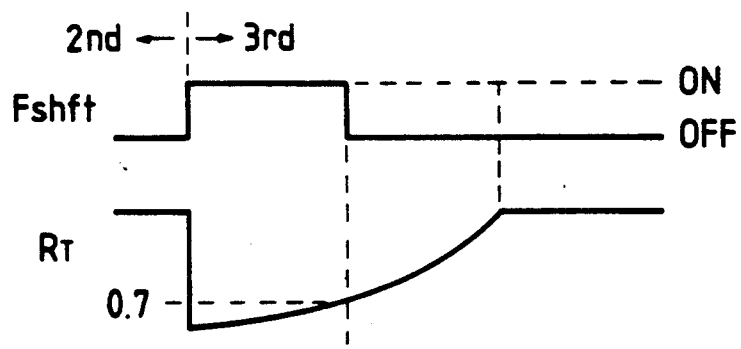

In the above-described lock-up control, the lock-up is released until the torque converter input/output rotation ratio RT becomes above the predetermined value RTL (about 1), i.e., until the torque converter slip sufficiently becomes small, (see FIG. 47). In order to further improve the fuel consumption, the predetermined value RTL can be reduced, for example, to 0.7 (the torque converter slip allowable range is enlarged) so that lock-up region is enlarged (see FIG. 48).

Here, as described above, the time of the start means that the transmission gear position is a LOW position (the gear position corresponding to the smallest transmission gear ratio), or at least one of the engine speed and vehicle speed indicates a time shorter than a predetermined time and the time of the speed-change indicates a predetermined time after the variation of the transmission gear position instruction to be determined in accordance with the accel-operating amount and the vehicle speed.

Figure 45:
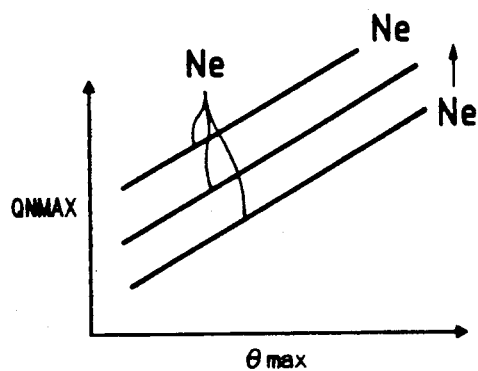
FIGS. 45 and 46 are illustrations of characteristics produced by modifying the parameters used in the FIG. 42 rountine.
Figure 46:
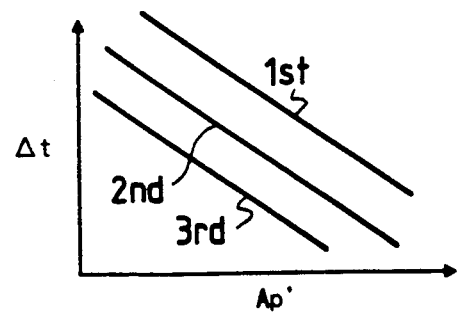

Vehicle Resonance Reducing Throttle Control Where Airfolow Meter is Compensated for Overshoot Secondly, a description will be made hereinbelow with reference to FIG. 42 in terms of the vehicle resonance reducing throttle control for preventing the exessive air-fuel ratio rich state at the initial time of the acceleration due to the overshooting. A step 1 is first executed so as to check whether an acceleration initial time flag XQN is in the ON or OFF state, the acceleration initial time flag XQN taking the ON state for a predetermined Δt. The initial time flag XQN takes the ON state until elapse of the predetermined time Δt after satisfaction of the accel-operating speed AP'>APL (APL is a predetermined value greater than 0), otherwise taking the OFF state. In the step 1, in the case that the acceleration initial time flag XQN is in the OFF state (that is, no initial time of the acceleration), the operation jumps steps 2 to 4 for the overshoot compensation process for the airflow meter 90 and reaches a step 5. In the step 1, in the case that the acceleration initial time flag XQN is in the ON state (that is, the initial time of the acceleration), the step 2 follows to set the upper limit QNMAX of the engine load Q/N using a chart of FIG. 45 in accordance with the engine speed Ne and the peak throttle opening degree θmax which is the maximum value of the throttle opening degree θ, then followed by the step 3. The step 3 is provided in order to divide the intake air amount Q detected by the airflow meter 90 by the engine speed Ne to obtain an engine load Q/N and to check whether the obtained engine load Q/N exceeds the upper limit QNMAX. If exceeding the upper limit QNMAX, the operation goes to the step 5. If not, the step 4 follows to saturate the engine load Q/N with the upper limit QNMAX, thereafter followed by the step 5. In the step 5, the fuel injection amount corresponding to the engine load Q/N is calculated and is injected by the injector 15. Here, it is further effective that the predetermined time (acceleration initial time) Δt for setting the upper limit of the fuel injection amount is arranged to be changed in accordance with the transmission gear position and the accel-operating speed AP' as illustrated in FIG. 46.

FIG. 44 is a timing chart showing the execution of the above-described fuel control (at the initial time of the acceleration). After the accel-operating amount AP increases, the upper limit QNMAX is imposed on the engine load Q/N for the predetermined acceleration initial time Δt so as to prevent the excessive rich state of the air-fuel ratio A/F at the initial time of the acceleration. That is, the engine load Q/N is proportional to the intake air amount Q and this intake air amount Q is detected by the airflow meter 90, and further this airflow meter 90 is of the rotational and vane type or direct operated and linear type and hence overshoots. This overshooting can be cut by the setting of the upper limit QNMAX.

Figure 42:
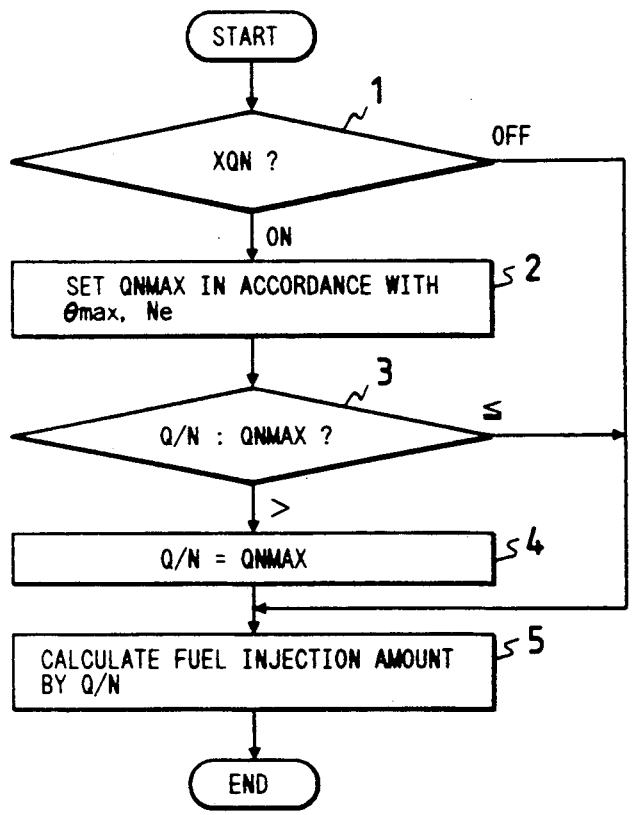
FIG. 42 is a flow chart showing the fuel injection amount calculating routine for compensating for the overshooting of a vane type or linear type airflow meter at the time of the acceleration.
Figure 43:
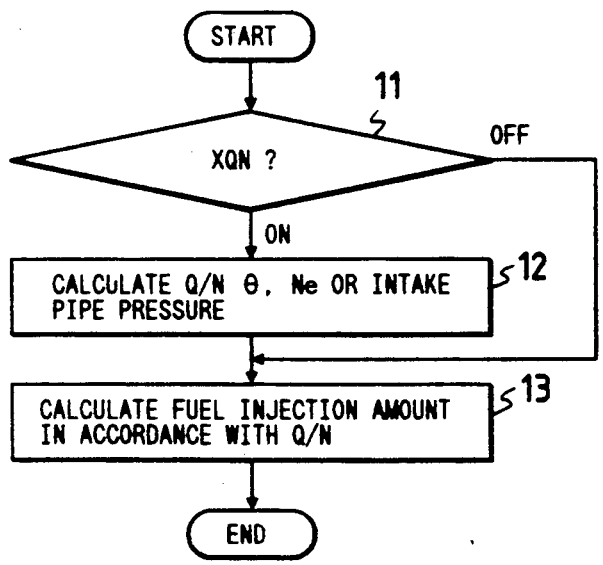
FIG. 43 is a flow chart showing a modification of the FIG. 42 routine.

Although in the FIG. 42 embodiment the upper limit is imposed on the engine load Q/N, it is appropriate that an upper limit is imposed on the fuel injection pulse width or the airflow meter output Q or the amount is decreased. Further, although the upper limit QNMAX is imposed on the engine load Q/N for the correction, it is also appropriate that as illustrated in FIG. 43 the engine load Q/N is estimated on the basis of the throttle opening degree θ and the engine speed Ne without using the airflow meter output, or the engine load Q/N is estimated on the basis of the intake air pressure (step 12) so as to calculate the fuel injection amount (step 13).

As described above, for performing the vehicle resonance reducing control (see FIGS. 2 to 36), the throttle valve 7 is once driven in the reverse direction (the throttle valve closing direction at the time of the acceleration) as indicated by character A in FIG. 44, and therefore, in the case that the air amount is directly detected by the airflow meter 90 so as to determine the fuel injection amount, the air-fuel ratio is directed to the excessive rich state due to the overshooting (intake air amount increasing direction) of the airflow meter 90 whereby the emission is deteriorated and the acceleration becomes dull. This problem can be eliminated by this embodiment. It is more preferable to perform both the above-described lock-up control and airflow meter overshoot compensation control.

The lock-up control is generally effected at the time of the steady state, it is also possible to perform the lock-up with the vehicle hunting being prevented at the time of the acceleration. Thus, it is possible to enlarge the lock-up region without lowering of the response and deterioration of the drive feeling, thereby improving the fuel consumption. Further, if also performing the lock-up at the time of the deceleration, the time of the rotation region higher than the fuel return rotational speed becomes longer, thereby lengthening the fuel cut time period at the time of the deceleration to improve the fuel consumption.

FIG. 50A is a schematic illustration for describing a further embodiment of this invention. Illustrated at reference 7a is a first throttle valve which is mechanically coupled to an acceleration pedal 41, that is, which is coupled to a wire 41c for detecting the accel-operating amount. Further included is a second throttle valve 7b which is mechanically independent from the acceleration pedal 41 and which is normally in the fully opening state. In response to the fact that in the step 4011 of FIG. 24 the torque correction condition is satisfied, a step motor is driven through an ECU 50 so that second throttle valve 7b is operated in the closing direction for a predetermined time period. The second throttle valve 7b is normally in the full opening state, and this operation is effected only at the time of the acceleration. The time period T for driving the second throttle valve 7b can be determined as well as the above-described embodiments. Further, the second throttle valve 7b is not always required to be operated to the fully closing position, and the opening degree can be determined in accordance with the driving state. FIG. 50A is an illustration for understanding the first and second throttle opening degrees of the first and second throttle valves 7a and 7b.

It should be understood that the foregoing relates to preferred embodiments of this invention, and that it is intended to cover all changes and modifications of the embodiments of the invention herein used for the purposes of the disclosure, which do not constitute departures from the spirit and scope of the invention.

What is claimed is:

1. A control apparatus for use in an internal combustion engine system of a motor vehicle equipped with an automatic transmission having therein a lock-up mechanism, said control apparatus comprising:
   vehicle resonance reducing means for controlling an opening degree of a throttle valve when said motor vehicle is in an acceleration state so as to reduce a vehicle resonance accompanying an operation of said engine; and
   lock-up control means for compulsorily locking up said automatic transmission when said vehicle resonance reducing means is in operation.

2. A control apparatus as claimed in claim 1, wherein said lock-up control means locks up said automatic transmission when said motor vehicle is in a predetermined operating state except that when said motor vehicle is in a start state and a speed-changing state.

3. A control apparatus for use in an internal combustion engine of a motor vehicle, comprising:
   vehicle resonance reducing means for controlling an opening degree of a throttle valve on the basis of an operating condition of said engine so as to reduce a vehicle resonance accompanying an operation of said engine and further for reversely and temporarily moving said throttle valve in a closing direction when said motor vehicle is in an acceleration state;

intake air amount detecting means mounted on said motor vehicle for detecting the amount of an intake air to be supplied to said engine;

fuel injection amount calculating means for calculating a fuel injection amount on the basis of the detected intake air amount; and overshoot correction means for correcting an overshooting portion of the intake air amount detected by said intake air amount detecting means when said vehicle resonance reducing means is in operation and when the acceleration is at an initial stage so as to prevent overshooting of the fuel injection amount at the initial stage of the acceleration.

4. A control apparatus as claimed in claim 3, wherein the initial stage of the acceleration is a time period until a predetermined time is elapsed after an operating speed of an acceleration pedal of said motor vehicle becomes above a predetermined value.

5. A control apparatus as claimed in claim 3, wherein said overshoot correcting means performs the overshoot correction where an engine load to be obtained on the basis of the detected intake air amount is greater than a predetermined load value and is saturated with said predetermined load value if greater than said predetermined load value.

6. A control apparatus as claimed in claim 3, wherein said vehicle resonance reducing means includes: said throttle valve for controlling a torque of said engine; accel-opening amount detecting means for detecting an operating amount of an acceleration pedal due to a driver of said motor vehicle; engine-operating state detecting means for detecting an operating state of said engine; vehicle operation variable detecting means for detecting a variable of said motor vehicle; torque estimating means for estimating a torque to be required for said engine on the basis of the detected accel-operating amount and the detected engine-operating state; torque correcting means for correcting the estimated torque estimated by said torque estimating means on the basis of the detected vehicle operation variable so as to prevent hunting of said motor vehicle; target throttle opening degree calculating means for calculating a target throttle opening degree of said throttle valve on the basis of the corrected torque after the correction due to said torque correcting means; and throttle driving means for driving said throttle valve to the target throttle opening degree calculated by said target throttle opening degree calculating means.

7. A control apparatus as claimed in claim 6, wherein the operation of said torque correcting means is prohibited when the variation speed of the accel-operating amount to be detected by said accel-operating amount detecting means is below a predetermined value.

8. A control apparatus as claimed in claim 6, wherein said engine-operating state detecting means detects a rotational speed of said engine as the engine operating state.

9. A control apparatus as claimed in claim 6, wherein said torque correcting means is equipped with filtering means for filtering an estimated torque signal from said torque estimating means, said filtering means having a characteristic to damp a specific frequency component included in said estimated torque signal, which causes the hunting, with a predetermined damping factor.

10. A control apparatus as claimed in claim 9, wherein said filtering means has the filtering characteristic for amplifying said estimated torque signal in a predetermined high-frequency region higher than said specific frequency.

11. A control apparatus as claimed in claim 10, wherein said high-frequency region is changed in accordance with environment variables including a frictional state of a road surface and an irregularity of said road surface.

12. A control apparatus as claimed in claim 9, wherein at least one of said specific frequency and said damping factor is determined on the basis of a signal from said vehicle operation variable detecting means.

13. A control apparatus for use in an internal combustion engine of a motor vehicle, comprising:

vehicle resonance reducing means for controlling an opening degree of a throttle valve on the basis of an operating condition of said engine so as to reduce a vehicle resonance accompanying an operation of said engine and further for reversely and temporarily moving said throttle valve in a closing direction when said motor vehicle is in an acceleration state;

intake air amount detecting means mounted on said motor vehicle for detecting the amount of an intake air to be supplied to said engine;

engine speed detecting means for detecting a rotational speed of said engine;

fuel injection amount calculating means for calculating a fuel injection amount on the basis of the detected intake air amount and the detected engine speed; and calculation means for calculating a fuel injection amount on the basis of the opening degree of said throttle valve and the detected engine speed or on the basis of an intake pipe pressure when said vehicle resonance reducing means is in operation and when the acceleration is at an initial stage.

14. A control apparatus as claimed in claim 13, wherein the initial stage of the acceleration is a time period until a predetermined time is elapsed after an operating speed of an acceleration pedal of said motor vehicle becomes above a predetermined value.

15. A control apparatus as claimed in claim 1, wherein said vehicle resonance reducing means includes: said throttle valve for controlling a torque of said engine; accel-opening amount detecting means for detecting an operating amount of an acceleration pedal due to a driver of said motor vehicle; engine-operating state detecting means for detecting an operating state of said engine; vehicle operation variable detecting means for detecting a variable of said motor vehicle; torque estimating means for estimating a torque to be required for said engine on the basis of the detected accel-operating amount and the detected engine-operating state; torque correcting means for correcting the estimated torque estimated by said torque estimating means on the basis of the detected vehicle operation variable so as to prevent hunting of said motor vehicle; target throttle opening degree calculating means for calculating a target throttle opening degree of said throttle valve on the basis of the corrected torque after the correction due to said torque correcting means; and throttle driving means for driving said throttle valve to the target throttle opening degree calculated by said target throttle opening degree calculating means.

16. A control apparatus as claimed in claim 15, wherein said torque correcting means is equipped with filtering means for filtering an estimated torque signal from said torque estimating means, said filtering means having a characteristic to damp a specific frequency component included in said estimated torque signal, which causes the hunting, with a predetermined damping factor.

17. A control apparatus as claimed in claim 15, wherein the operation of said torque correcting means is prohibited when the variation speed of the accel-operating amount to be detected by said accel-operating amount detecting means is below a predetermined value.

18. A control apparatus as claimed in claim 15, wherein said engine-operating state detecting means detects a rotational speed of said engine as the engine operating state.

19. A control apparatus as claimed in claim 16, wherein said filtering means has the filtering characteristic for amplifying said estimated torque signal in a predetermined high-frequency region higher than said specific frequency.

20. A control apparatus as claimed in claim 19, wherein said high-frequency region is changed in accordance with environment variables including a frictional state of a road surface and an irregularity of said road surface.

21. A control apparatus as claimed in claim 16, wherein at least one of said specific frequency and said damping factor is determined on the basis of a signal from said vehicle operation variable detecting means.

22. A control apparatus as claimed in claim 13, wherein said vehicle resonance reducing means includes: said throttle valve for controlling a torque of said engine; accel-opening amount detecting means for detecting an operating amount of an acceleration pedal due to a driver of said motor vehicle; engine-operating state detecting means for detecting an operating state of said engine; vehicle operation variable detecting means for detecting a variable of said motor vehicle; torque estimating means for estimating a torque to be required for said engine on the basis of the detected accel-operating amount and the detected engine-operating state; torque correcting means for correcting the estimated torque estimated by said torque estimating means on the basis of the detected vehicle operation variable so as to prevent hunting of said motor vehicle; target throttle opening degree calculating means for calculating a target throttle opening degree of said throttle valve on the basis of the corrected torque after the correction due to said torque correcting means; and throttle driving means for driving said throttle valve to the target throttle opening degree calculated by said target throttle opening degree calculating means.

23. A control apparatus as claimed in claim 22, wherein said torque correcting means is equipped with filtering means for filtering an estimated torque signal from said torque estimating means, said filtering means having a characteristic to damp a specific frequency component included in said estimated torque signal, which causes the hunting, with a predetermined damping factor.

24. A control apparatus as claimed in claim 23, wherein said filtering means has the filtering characteristic for amplifying said estimated torque signal in a predetermined high-frequency region higher than said specific frequency.

25. A control apparatus as claimed in claim 24, wherein said high-frequency region is changed in accordance with environment variables including a frictional state of a road surface and an irregularity of said road surface.

26. A control apparatus as claimed in claim 23, wherein at least one of said specific frequency and said damping factor is determined on the basis of a signal from said vehicle operation variable detecting means.

27. A control apparatus as claimed in claim 22, wherein the operation of said torque correcting means is prohibited when the variation speed of the accel-operating amount to be detected by said accel-operating amount detecting means is below a predetermined value.

28. A control apparatus as claimed in claim 22, wherein said engine-operating state detecting means detects a rotational speed of said engine as the engine operating state.

29. A control apparatus for use in an internal combustion engine of a motor vehicle, comprising:
   a throttle valve for controlling a torque of said engine;
   accel-operating amount detecting means for detecting an accel-operating amount due to a drive of said motor vehicle;
   throttle driving means for driving said throttle valve in accordance with the detected accel-operating amount so as to increase and decrease the torque of said engine in accordance with increase and decrease in said detected accel-operating amount; and
   torque control means for compulsorily controlling the torque of said engine in a direction reverse to the increasing or decreasing direction of the detected accel-operating amount while the detected accel-operating amount varies.

30. A control apparatus as claimed in claim 29, wherein said torque control means drives said throttle valve in a direction reverse to the accel-operating amount increasing or decreasing direction.

31. A control apparatus as claimed in claim 29, wherein said torque control means controls the torque of said engine in a direction reverse to the accel-operating amount increasing or decreasing direction for a predetermined time period determined in accordance with an operation variable of said motor vehicle.

32. A control apparatus as claimed in claim 29, wherein said motor vehicle is equipped with an automatic transmission having therein a lock-up mechanism and lock-up control means for compulsorily locking up said automatic transmission when said torque controlling means is in operation.

33. A control apparatus for use in an internal combustion engine of a motor vehicle, comprising:
   a throttle valve for controlling a torque of said engine;
   accel-operating amount detecting means for detecting an accel-operating amount due to a drive of said motor vehicle;
   throttle driving means for driving said throttle valve in accordance with the detected accel-operating amount so as to increase and decrease the torque of said engine in accordance with increase and decrease in said detected accel-operating amount;
   torque controlling means for compulsorily keeping the torque of said engine or reducing the increasing or decreasing speed of the torque of said engine at least one time for a predetermined time period while the detected accel-operating amount varies;
   vehicle operation variable detecting mean for detecting an operation variable of said motor vehicle; and
   decision means for deciding said predetermined time period that said torque controlling means operates in accordance with the operation variable detected by said vehicle operation variable.

34. A control apparatus for use in an internal combustion engine of a motor vehicle, comprising:

first and second throttle valves for controlling a torque of said engine;

accel-operating amount detecting means for detecting an accel-operating amount due to a driver of said motor vehicle;

first throttle driving means for driving said first throttle valve in accordance with the detected accel-operating amount so as to increase or decrease the torque of said engine in accordance with increase or decrease in the accel-operating amount; and second throttle driving means for driving said second throttle valve at least one time in a direction reverse to the accel-operating amount increasing or decreasing direction when the accel-operating amount varies and when traction operation is not effected.

35. A control apparatus as claimed in claim 34, further comprising acceleration state detecting means for detecting an acceleration state of said engine, and wherein said second throttle valve is normally opened by a predetermined opening degree, and said second throttle driving means temporarily drives said second throttle valve in the valve-closing direction when said acceleration state detecting means detects the acceleration state of said engine and when the traction operation is not effected.

36. A control apparatus as claimed in claim 34, wherein said first and second throttle valves are in series provided in an intake pipe of said engine.

* * * * *

UNITED STATES PATENT AND TRADEMARK OFFICE
CERTIFICATE OF CORRECTION

PATENT NO. : 5,101,786
DATED : April 7, 1992
INVENTOR(S) : KAMIO et al

It is certified that error appears in the above-identified patent and that said Letters Patent is hereby corrected as shown below:

ON THE TITLE PAGE:

Please Change

"(54) CONTROL SYSTEM FOR CONTROLLING OUTPUT TORQUE INTERNAL . . . "

to

---(54) CONTROL SYSTEM FOR CONTROLLING OUTPUT TORQUE OF INTERNAL . . .--

Signed and Sealed this

Thirty-first Day of August, 1993

Attest:

BRUCE LEHMAN

*Attesting Officer*  *Commissioner of Patents and Trademarks*